United States Patent
Fukushima et al.

(12)

(10) Patent No.: US 6,829,076 B2
(45) Date of Patent: Dec. 7, 2004

(54) ACTUATOR APPARATUS

(75) Inventors: Toshiaki Fukushima, Tokorozawa (JP); Kazuo Suzuki, Kawagoe (JP); Shigeru Futakami, Tokorozawa (JP); Takashi Abe, Tokyo (JP); Takahiro Kawada, Higashimurayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 10/385,618

(22) Filed: Mar. 12, 2003

(65) Prior Publication Data

US 2003/0184186 A1 Oct. 2, 2003

(30) Foreign Application Priority Data

Mar. 12, 2002 (JP) ....................................... 2002-066750

(51) Int. Cl.[7] ................................................ G02F 1/09
(52) U.S. Cl. ...................................... 359/280; 359/237
(58) Field of Search ............................ 359/237, 280, 359/109, 117–19, 127–8, 139, 193, 822–4; 396/55; 360/99.04; 310/154.01, 156.01, 152, 154.21, 154.08–154.9

(56) References Cited

U.S. PATENT DOCUMENTS 5,974,269 A * 10/1999 Sato et al. .................... 396/55

6,043,922 A * 3/2000 Koga et al. .................. 398/213
6,051,902 A * 4/2000 Ogino et al. ............ 310/154.01
6,147,427 A * 11/2000 Ackermann et al. .... 310/154.36

FOREIGN PATENT DOCUMENTS

JP 2001-075026 3/2001

* cited by examiner

Primary Examiner—Jordan M. Schwartz
Assistant Examiner—Jessica Stultz
(74) Attorney, Agent, or Firm—Smith, Gambrell & Russell, LLP

(57) ABSTRACT

An actuator apparatus, comprising a rotating shaft supported in a freely rotating condition, a rotor magnet consisting of a permanent magnet which is polarized at two poles and is fastened to the rotating shaft; means for defining a first rotational position when the rotating shaft rotates in one direction; means for defining a second rotational position when the rotating shaft rotates in the other direction; and driving means for driving the rotating shaft and rotor magnet, wherein a self-hold state is formed by yokes arranged so as to form a closed magnetic circuit between the one pole and the other pole of the above-mentioned rotor magnet in at least one of the above-mentioned first rotational position and the second rotational position.

12 Claims, 24 Drawing Sheets

DIRECTION OF POLARIZATION (a)

(b)

(a)

(b)

(a)

(b)

(a)

(b)

(a)

(b)

(a)

(b)

(a)

(b)

(c)

(d)

ACTUATOR APPARATUS

BACKGROUND OF THE INVENTION

1. Field of the Invention

The present invention relates to an actuator apparatus, and more particularly, to an actuator, which is used in an optical communications system or the like, and which, for example, is applicable to a driven-type mechanical optical switch, for arranging a pair of optical fibers by aligning them with an optical axis, and moving either a mirror or a shielding plate in and out of the gap therebetween.

2. Description of the Related Art

In recent years, actuator apparatus capable of achieving high-speed, high-precision displacement are desired for use in optical switching devices and so forth in optical transmission systems, such as optical LAN (local area networks) in particular. In order to apply these actuator apparatus to optical switches in particular, the actuator apparatus must have a moving speed of about eleven to nineteen milliseconds, and must possess accuracy of around ±1 μm, and various methods for achieving this have been proposed. Among these systems, the mechanical optical switch is advantageous in that, since the direction of propagation of direct light can be changed by mechanically driving a fiber or mirror (or shielding plate) using a mechanical switch, there is less loss of light and cross-talk inside the switch than there is with optical switches of other systems, and commercialization of mechanical optical switches is being pushed forward as the most promising technology capable of being applied to optical switches.

As mechanical optical switching technology in this technical field, a mirror drive-type mechanical 2×2 optical switch is disclosed in Japanese Patent Laid-open No. 2001-75026. This prior art will be explained using a diagram of the prior art.

First, the optical fiber portion constituting an optical switch will be explained initially. In this optical fiber portion, there is disposed a first collimator lens assembly 105, which arranges a pair of optical fibers 101, 103 symmetrically with the optical axis of the lens, and a second collimator lens assembly 111, which arranges a pair of optical fibers 107, 109 symmetrically with the optical axis of this collimator lens, and these first and second collimator lens assemblies 105, 111 are placed opposite one another, and their optical axes are aligned. At this time, the first and second collimator lens assemblies 105, 111 are arranged such that optical fiber 101 and optical fiber 109, and optical fiber 103 and optical fiber 107 mutually cross over to form optical connections, and these assemblies are supported by alignment block 113. Then, the above-mentioned first and second collimator lens assemblies 105, 111 are constituted from a pair of optical fibers not shown in the figure, and a ferrule for supporting the optical fibers, and an approximately 0.25-pitch rod lens, which is connected to the optical fibers and ferrule tip.

Next, the actuator apparatus in the prior art will be explained. A shaft opening provided parallel to the optical axis of the lens is disposed in the above-mentioned alignment block 113, and a reflecting mirror shaft 115 is inserted into this shaft opening.

Since a reflecting mirror 117 must accurately reflect light being emitted from the above-mentioned optical fibers 101, 103, a reflecting mirror reference plane 119 is machined into the alignment block 113 perpendicular to the optical fibers, and reflecting mirror 117 makes contact with the surface of this reflecting mirror reference plane 119, and its perpendicularity is defined. According to this constitution, it is a state in which the surface of the reflecting mirror 117 is made perpendicular to the optical axis of the above-mentioned optical fibers, and the reflecting mirror 117 can rotate together with the above-mentioned reflecting mirror shaft 115.

In addition, this reflecting mirror 117 is capable of moving between a first position, in which the reflecting mirror 117 is perpendicular to the optical axis of the lens at the lens focal plane, and reflects light from the respective optical fibers, and a second position, in which the reflecting mirror 117 allows light to pass through, and this operation is carried out by a motor (DC micromotor 121), which is driving means. This specific driving means is capable of arbitrarily moving the above-mentioned reflecting mirror 117 from the first position to the second position having the above-mentioned reflecting mirror shaft 115 as the supporting point, in accordance with a bushing 123 and an eccentric pin 125 mounted to the motor shaft of DC micromotor 121.

Further, since the above-mentioned reflecting mirror 117 is precisely moved in and out of the gap of the above-mentioned pair of optical fibers 101, 103 by the above-mentioned actuator apparatus, a mechanism is required to define the above-mentioned first position and second position. This mechanism is constituted such that the above-mentioned eccentric pin 125 is inserted into a notched groove 127 (for example, a V shape) formed in a specified shape in the above-mentioned alignment block 113, and the constitution is such that rotating the above-mentioned motor shaft in one direction determines the first position by bringing this eccentric pin 125 into contact with a face of this notched groove 127, and, in addition, rotating the motor shaft in the other direction determines the second position by bringing this eccentric pin 125 into contact with the opposite face of the notched groove 127.

Furthermore, a permanent magnet 129 is embedded inside the alignment block 113 in a location close to the reflecting mirror shaft 115, and by virtue of this permanent magnet 129 biasing reflecting mirror shaft 115, which comprises a magnetic substance, in one direction in the first position, at which light from the optical fibers is reflected, the slow moving mirror rotation shaft 115 is constantly set in the same position. Accordingly, in addition to causing the light emitted from the optical fibers to be accurately reflected, subsequent to moving the reflecting mirror 117 to the intended position, the position of this reflecting mirror 117 can be maintained as a self-hold state, wherein this position is held by the magnetic attracting force of the permanent magnet 129 without energizing the DC motor 121.

Combining a conventional actuator apparatus constituted in this manner with the above-mentioned optical fiber portion realized the moving speed and precision of the actuator apparatus of the above-mentioned optical switch, and resulted in a compact mechanical optical switch, which also featured good repeatability, and was not susceptible to the effects of external forces, such as vibrations and impacts.

Furthermore, the above-mentioned reflecting mirror 117 was constituted by coating a metal base material, such as a stainless steel, on both sides with Ti—N of a hardness of MHv 1800 or greater, and, in addition, attaching a high reflectivity coating of gold (Au), platinum (Pt) or the like via either sputtering or electroless plating.

However, although a conventional actuator apparatus excels from the aspects of moving speed and precision, it has the following disclosed problems.

To operate an optical switch normally, conventional actuator apparatus specified the perpendicularity of the reflecting mirror 117 by causing surface contact between the alignment block 113 and the reflecting mirror 117, and moved the reflecting mirror 117 in and out of the optical fiber portion in a state, wherein the reflecting mirror 117 was constantly perpendicular to the optical axis of the above-mentioned optical fibers. However, when rotating this reflecting mirror 117 between the first position and the second position, this reflecting mirror 117 had to be rotated as-is with surface contact between the alignment block 113 and reflecting mirror shaft 115, and between the alignment block 113 and the reflecting mirror 117. Accordingly, there are problems from the standpoint of long-term reliability in that, when an optical switch is operated for a long period of time by rotating this reflecting mirror 117, there are times when, due to the friction of the above-mentioned surface contact, the reflecting mirror shaft 115 supporting this reflecting mirror 117 gradually slips out of position, or the perpendicularity of the reflecting mirror 117 is lost, enabling the assumption that it will become impossible to accurately reflect the light emitted from the optical fibers.

Further, conventional actuator apparatus must use a powerful permanent magnet 129 to attract the reflecting mirror shaft 115, which has a large moment of inertia, in order to achieve the above-mentioned self-hold state, and to suppress slight changes in the reflecting mirror resulting from external shocks. The constitution is such that, even when the reflecting mirror 117 is moved between the first position and the second position, it is driven while the permanent magnet 129 attracts the reflecting mirror shaft 115 as-is. For this reason, it should come as no surprise that during the movement, the DC micromotor 121 must overcome the attracting force of this permanent magnet 129, and must constantly generate enough force to enable the reflecting mirror 117 to move. Therefore, the torque of the DC micromotor 121 must be made sufficiently large, resulting in high power consumption.

SUMMARY OF THE INVENTION

An object of the present invention is to provide a compact actuator apparatus that is capable of achieving stable repeatability even when driven for a long period of time, and moreover, features excellent durability, and can also perform driving at low power consumption.

To achieve the above object, the present invention will employ a technological constitution such as that disclosed hereinbelow.

To solve for the above-mentioned problems, a first aspect of the present invention has a constitution, which comprises a rotating body comprising a rotating shaft supported in a freely rotating condition, and a rotor magnet affixed to this rotating shaft; driving means for rotationally driving this rotating body; and at least one yoke, which forms a closed magnetic circuit connecting the poles of the rotor magnet, and which carries out self-hold relative to the rotating body in a prescribed rotational position. Further, a second aspect of the present invention has a constitution, which comprises a rotating body comprising a rotating shaft supported in a freely rotating condition, and a rotor magnet affixed to this rotating shaft; first defining means for defining the rotating body to a first rotational position; second defining means for defining the rotating body to a second rotational position; driving means for rotationally driving the rotating body between first defining means and second defining means; and at least one yoke, which forms a closed magnetic circuit between the poles of the rotor magnet in a rotational position of at least one side of the first rotational position or the second rotational position, and which carries out self-hold relative to the rotating body in this rotational position.

Here, at least one of the rotor magnet or yoke is a permanent magnet, and the other is an electromagnet, and the rotating body is subjected to self-hold by the magnetic force of the permanent magnet.

Further, driving means comprises either at least one exciting coil disposed in at least one yoke, or an exciting coil disposed in the rotor magnet, and uses either one of the exciting coils to rotate the rotating shaft via a magnetic attracting action and/or a magnetic repulsing action acting between the yoke and the rotor magnet.

Further, defining means comprises a member for determining a rotational position by either making contact with a portion of the rotating body or using a magnetic attraction at a rotational position defined by defining means. When the rotational position determining member makes contact with the rotating body, it can be constituted by a striking member.

Further, a yoke can be constituted by either integrating or combining the respective magnetic materials of a rotational position determining member arranged so as to make contact with or to be magnetically attracted to one pole of the rotor magnet at a prescribed rotational position, and another rotational position determining member arranged so as to make contact with or to be magnetically attracted to the other pole of the rotor magnet.

Further, the rotor magnet is polarized at two poles either perpendicular to or in parallel with the direction of the rotating shaft, and can carry out self-hold relative to the rotating body by forming a closed magnetic circuit between itself and the yoke, and further, and can rotate the rotating body by generating magnetic attractions and magnetic repulsions between itself and the yoke, carrying out switching. Further, the rotating body and rotational position determining members can be made into shapes, which enable them to make surface contact with one another, thereby making it possible to increase the self-hold force.

Further, the rotating body comprises a driven body, which is inserted and removed from the gap of a pair of optical fibers, at least one part of which is aligned with the optical axis, in accordance with the rotation of this rotating body, and the conduction of light between optical fibers is controlled by this driven body. Here, the switching of light is performed by disposing a reflective surface on the driven body, and reflected the light by virtue of this reflective surface. By forming the reflective surface perpendicular to the rotating body, light can be switched between pairs of optical fibers, which are arranged parallel to the rotating shaft.

Further, by making the constitution such that either the center of gravity of the rotor magnet and center of gravity of the above-mentioned rotating shaft approximately correspond, or the center of gravity of the rotor magnet and shielding plate and center of gravity of the rotating shaft approximately correspond, it is possible to reduce drift resulting from angular moment when the actuator is acted on by an external force.

Further, by providing a shielding plate in a position that is symmetrical to the reflective surface relative to the rotating body, and providing a position detecting portion for detecting the rotational position of the rotating body corresponding to the operation of this shielding plate, it is possible to control conduction to the exciting coil by providing the output from this position detecting portion as feedback.

DESCRIPTION OF THE PREFERRED EMBODIMENTS

Figure 1:
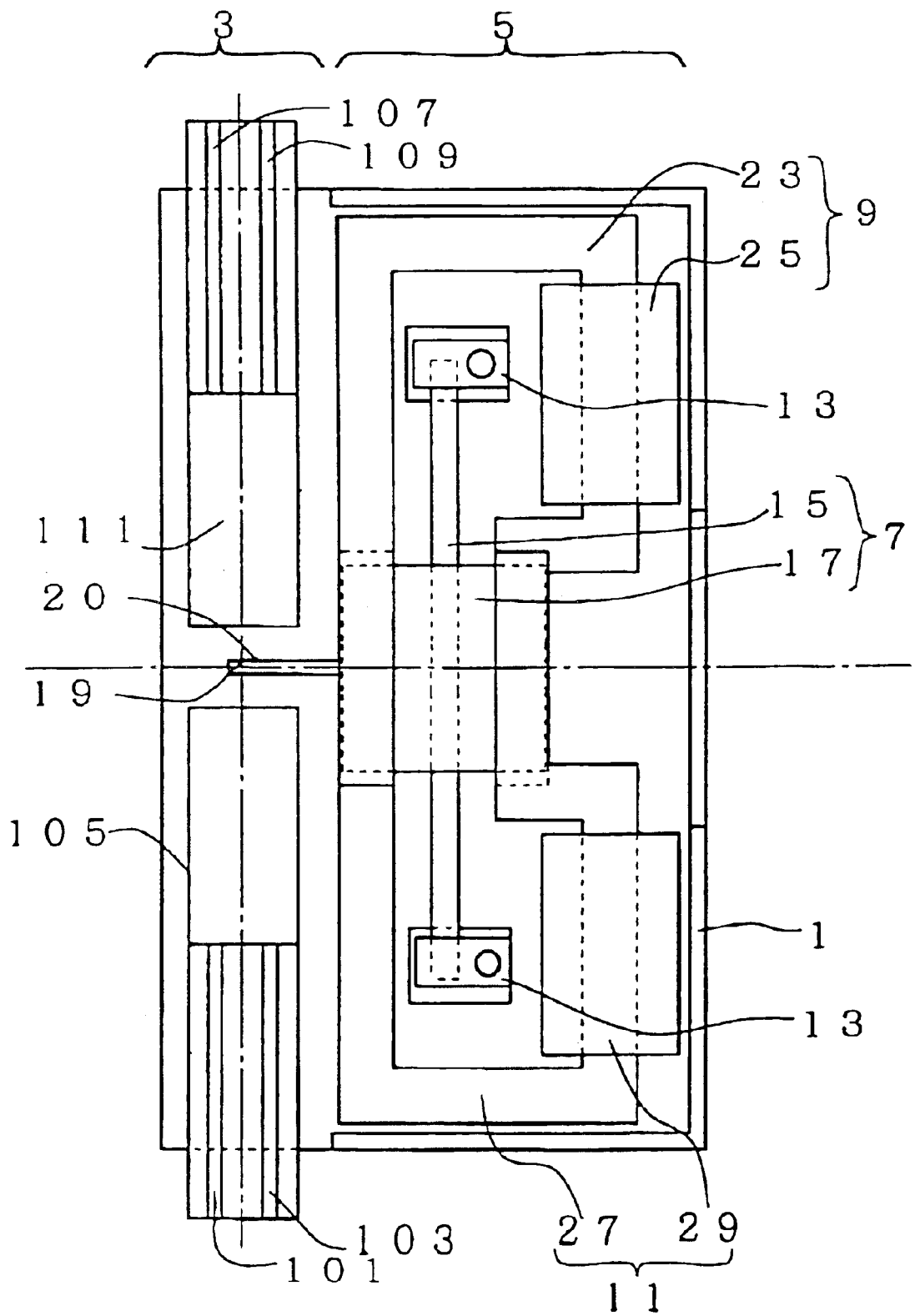
FIG. 1 is a structural plan view for illustrating an example of a constitution in which an actuator apparatus of the present invention is applied to an optical switch.

The constitutions of actuator apparatus in the best aspects for implementing the present invention will be explained hereinbelow using the figures. FIG. 1 is an apparatus plan view for illustrating the constitution of an actuator apparatus of the present invention, which is applied to an optical switch. Furthermore, in this figure, the same members as those in the prior art will be explained by assigning the same reference numerals.

As shown in FIG. 1, a rotating body 7 comprising a rotating shaft 15 supported in a freely rotating condition, and a rotor magnet 17 disposed in the center portion of this rotating shaft 15, is arranged in a prescribed location of a main body 1. An actuator portion 5 comprises a first yoke 23 arranged in the vicinity of rotor magnet 17, and the holding force of this yoke performs self-hold on rotating body 7 in a first rotational position.

Further, a first yoke 23, together with a first exciting coil 25, constitutes a first magnetic circuit portion 9. This first magnetic circuit portion 9, by generating enough turning force to move from the first rotational position to a second rotational position, which will be explained in a subsequent paragraph, can move the above-mentioned rotor magnet 17 in a prescribed direction to the second rotational position, enabling switching in one direction.

In other words, first magnetic circuit 9, comprising first exciting coil 25 in first yoke 23, generates enough turning force to move from the first rotational position to the second rotational position, thereby turning rotating body 7 and carrying out switching in the other direction, and, in addition, moving from a first self-hold state to a second self-hold state.

Furthermore, actuator portion 5 comprises a second yoke 27 arranged in the vicinity of rotor magnet 17, and the holding force of this yoke performs self-hold on rotating body 7 in the second rotational position. This holding force can engage the second self-hold state even when power to first exciting coil 25 is shut off.

Further, a second magnetic circuit portion 11, comprising a second exciting coil 29 in second yoke 27, generates enough turning force to move from the second rotational position to the first rotational position in the opposite direction from the previous time, thereby turning rotating body 7 in the opposite direction from the direction of rotation of the previous time, and carrying out switching in the other direction, and, in addition, returning from the second self-hold state to the first self-hold state.

Furthermore, the actions of first exciting coil 25 and second exciting coil 29 make use of magnetic repulsion to rotate rotating body 7 in opposite directions.

The above-mentioned rotating shaft 15 is fastened in a freely rotating condition to main body 1 by a rotating body mounting 13, and first magnetic circuit portion 9 and second magnetic circuit portion 11 are fastened to main body 1 using screws, adhesive or other such arbitrary fastening means (not shown in the figure).

In addition, this rotating shaft 15 is held in the radial direction and thrust direction only by rotating body mounting 13. Holding in accordance with this rotating body mounting 13 can take the form of a limited frictional force bearing structure, for example, a ball bearing point contact structure. Thus, since an actuator apparatus of the present invention is limited to the minimum angle of rotation pursuant to switching operations, and there are only these two sliding areas, load resulting from friction generated when driving an actuator apparatus of the present invention can be made smaller than that of a conventional constitution. Moreover, frictional load at rotation time is generated as load torque, which is the radius of the rotating shaft times frictional force in the radial direction, but since the turning radius can be made sufficiently small, the above-mentioned rotating body 7 can be rotated with little torque.

Figure 3:
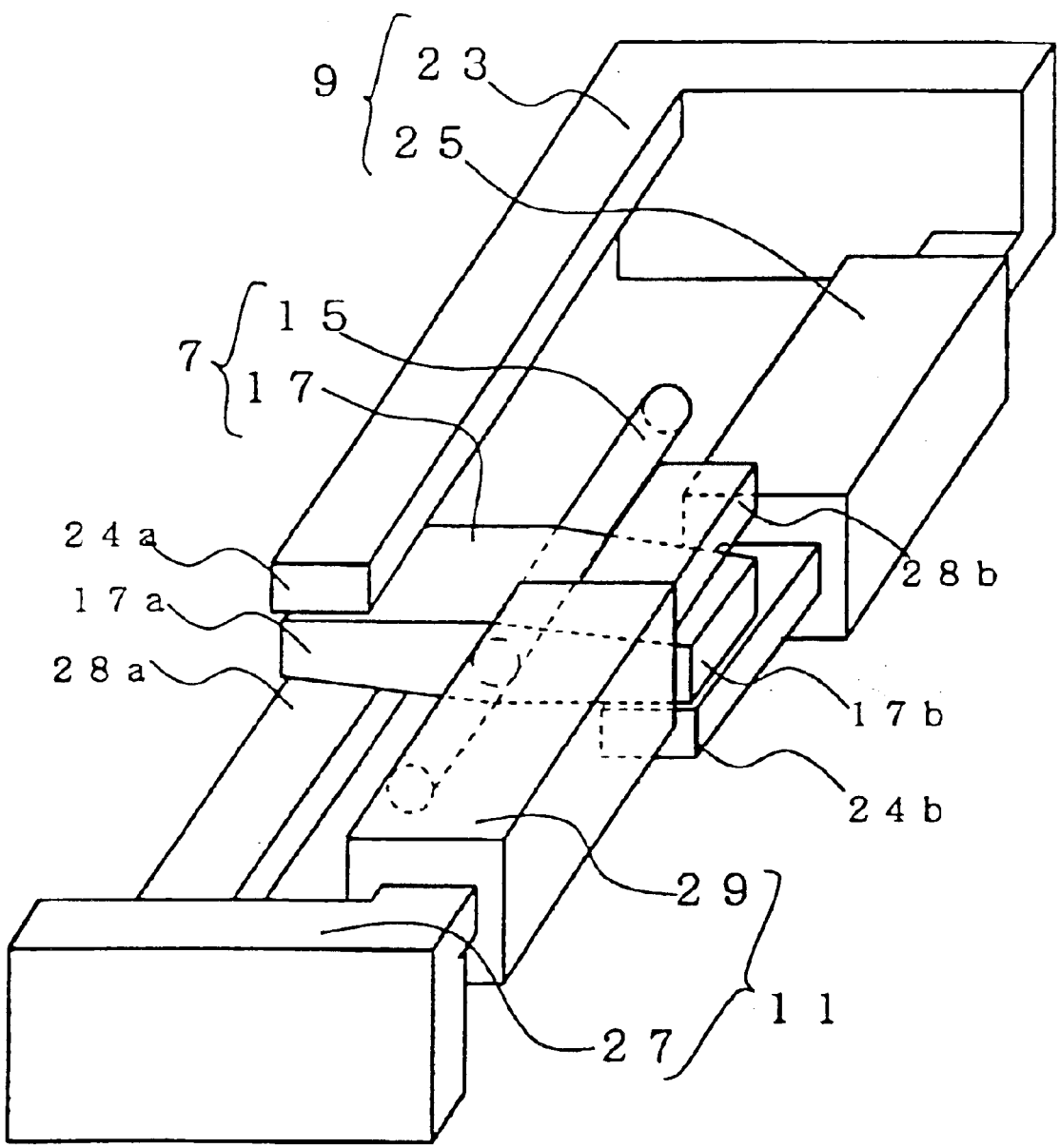
FIG. 3 is a perspective view for illustrating a constitution of an actuator apparatus of the present invention.

Next, the constitution of actuator portion 5 in this aspect of the embodiment will be explained in further detail. FIG. 3 is a perspective view for illustrating the constitution of an actuator apparatus of the present invention.

First magnetic circuit portion 9, which constitutes this actuator portion 5, is constituted by first yoke 23 and first exciting coil 25. This first yoke 23 is arranged such that, in the above-mentioned first rotational position, one of the poles 17a of rotor magnet 17 makes contact with a striking member 24a, and the other pole 17b makes contact with another striking member 24b. Striking members 24a, 24b are formed from a magnetic material, and can either be integrally constituted with yoke 23, or can connect to yoke 23.

The above-mentioned first yoke 23 is a magnetic material, such as, for example, soft magnetic iron, and first exciting coil 25 is wrapped around first yoke 23, then, the terminal of first exciting coil 25 is connected to either a terminal pin (not shown in the figure), or an FPC (not shown in the figure), is extended to the outside of main body 1, completes an electrical connections with the outside, and controls the actuator apparatus of the present invention.

Further, second magnetic circuit portion 11 is constituted by second yoke 27 and second exciting coil 29. The material of second yoke 27 is the same as that of the first yoke. Further, the constitution thereof is also the same, with the exception that the second yoke is constituted such that the above-mentioned rotor magnet 17 makes contact with a striking member 28a and another striking member 28b in the second rotational position.

In addition, the above-mentioned first yoke and second yoke are each integrally formed in the figure, but they can also be magnetically joined by combining a plurality of members.

The above-mentioned actuator apparatus can rotate the above-mentioned rotating body 7, and can perform switching for a variety of functions, and more specifically, for example, can arrange a shielding member, a reflecting mirror, a sensor or the like as either the rotating body itself, or as a driven body, which is driven together with the rotating body, and can function as a switch by rotating this rotating body 7. Furthermore, in addition to the sensor being disposed in either the rotating body or a driven body, it can also be disposed separately from this rotating body or driven body.

Here, as an example of a constitution (FIG. 1) for functioning as an optical switch, a constitution, in which a shielding plate 19 is arranged in the above-mentioned rotating body 7, and a reflecting mirror 20 is arranged on this shielding plate 19 by aligning it with the optical axis of the optical fibers, will be explained hereinbelow. This optical switch arranges an optical fiber portion 3 inside a main body 1 of an arbitrary size. This optical fiber portion 3 employs the same constitution as the constitution explained for the prior art, but this optical fiber portion 3 is not limited to the conventional constitution, and can also be another constitution.

Figure 2A:
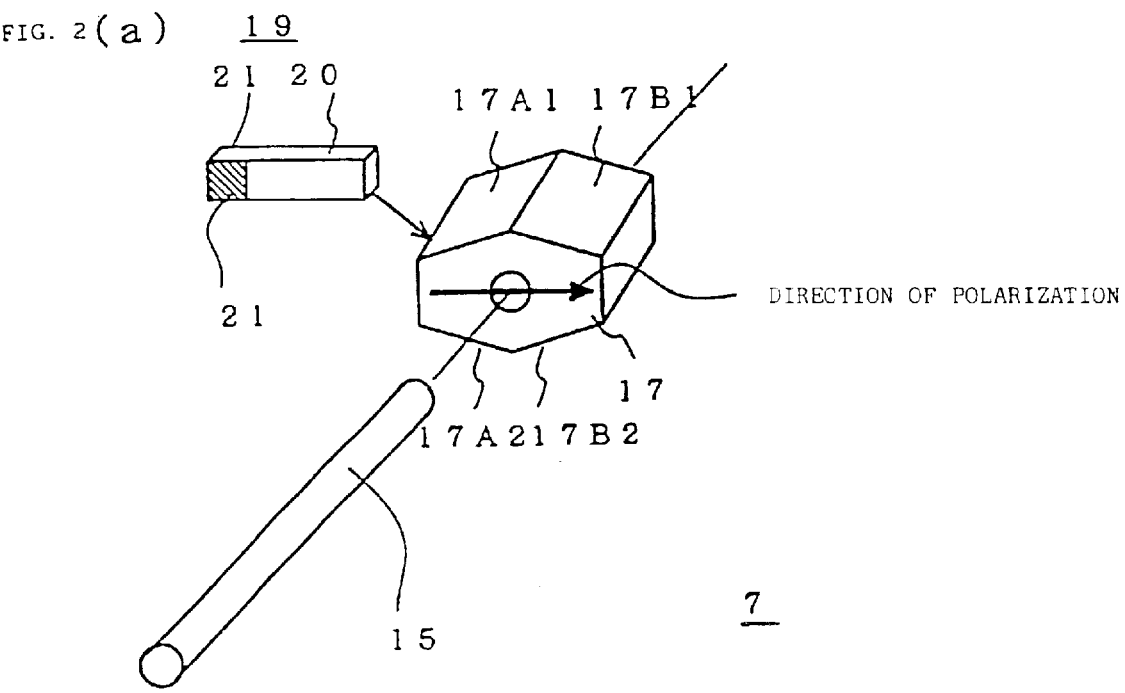
FIGS. 2(a) through 2(d) are exploded perspective views for illustrating a constitution of a rotating body of an actuator apparatus of the present invention.
Figure 2B:
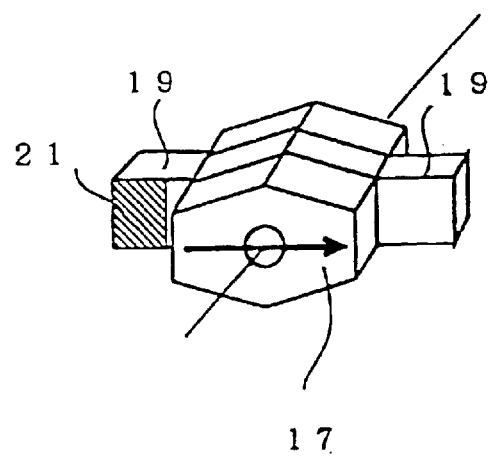

Next, the constitution of the above-mentioned rotating body 7 will be explained. FIG. 2 is an exploded perspective view for illustrating the constitution of a rotating body of an actuator apparatus of the present invention. The constitution of rotating body 7 is such that a rotating shaft 15 is inserted into a shaft opening of a rotor magnet 17, which comprises a permanent magnet, and integrally fastened using adhesive or the like, and a reflecting mirror 20 is fastened via adhesive or the like to either rotating shaft 15 or rotor magnet 17 and integrated to the rotating shaft, such that the reflecting mirror surface 21 is perpendicular to the axial direction of the rotating shaft. Furthermore, when reflecting mirror 20 is fastened to rotating shaft 15, the constitution can be such that this reflecting mirror 20 is held once on a shielding body 19 comprising plastic or other such holding material, and is fastened to rotating shaft 15 together with this shielding body 19. Further, making the length of the axial direction of rotating shaft 15 as long as possible within the scope permitted inside the main body 1 enables the installation precision of rotating shaft 15 to have as little affect as possible on the orientation of reflecting mirror surface 21, making it possible to hold reflecting mirror surface 21 orientation errors to the minimum. Furthermore, as for the mounting of reflecting mirror 20 to either rotating shaft 15 or rotor magnet 17, in addition to attaching it such that it makes contact with a side wall as shown in FIG. 2(a), it can also be done as shown in FIG. 2(b) by providing a shaft opening in the center of shielding body 19, which constitutes reflecting mirror 20, and fastening it by inserting rotating shaft 15 into this shaft opening.

Further, an actuator apparatus of the present invention, by arranging reflecting mirror surface 21 so as to be perpendicular to the direction of rotating shaft 15, can move the reflecting mirror surface into the space between first collimator lens assembly 105 and second collimator lens assembly 111 in the same plane by controlling the angular moment acting on rotor magnet 17. With this constitution, the angle of the reflective surface can be adjusted in a non-contact manner, without requiring a contact member as the prior arts did. Even if dust or the like should get between the end of a yoke and rotor magnet 17 causing the angle of rotation to drift slightly when this reflecting mirror surface 21 intercepts the light of the optical fibers, since this angle of rotation drift will not have an affect on the perpendicularity of the reflecting mirror surface 21 and the optical axis, this reflecting mirror surface 21 can constantly maintain the same angle relative to the optical axis of the optical fibers.

As for the composition of the above-mentioned rotor magnet 17, either SmCo or NdFeB or other such rare earth magnets can be used, and the rotor magnet 17 is polarized at two poles in a direction perpendicular to the radial direction of rotating shaft 15 (the direction of polarization in FIG. 2). As for the surfaces of rotor magnet 17 that face and make contact with first yoke 23, diagonal surfaces 17A1, 17B2 are formed such that surface contact becomes possible at a prescribed rotational position in a first self-hold state. Conversely, as for the surfaces of rotor magnet 17 that face and make contact with second yoke 27, diagonal surfaces 17B1, 17A2 are formed such that contact becomes possible at a rotational position reached by rotating in a direction opposite that described hereinabove, in a second self-hold state. Further, it is preferable that the shape of this rotor magnet 17 be one that enables surface contact as described hereinabove to enhance the self-holding force resulting from a closed magnetic circuit between rotor magnet 17 and a yoke, but as long as rotor magnet 17 is capable of making contact with the above-mentioned first and second yokes 23, 27, other shapes can be used.

Further, reflecting mirror 20 can be manufacturing by forming either a glass, or ceramics, or other such plate material having a smooth surface, plating a high-reflectance material, such as a metal, to the extent required on both the front and rear surfaces, and forming a reflecting mirror surface 21 that functions as a reflective layer.

An actuator apparatus of the present invention, by using a rotating body constitution such as that described hereinabove, can easily achieve approximate correspondence between the center of gravity of rotating body 7 and the center of gravity of rotating shaft 15. Furthermore, as used here, approximate correspondence signifies an extent, whereby the effect exerted on switching operations resulting from a moment caused by a displacement of the center of gravity of the rotating body and the center of gravity of the rotating shaft when actuator portion 5 receives a shock is held within a permissible scope. For example, by making the shielding body 19 into a shape that is symmetrical with the rotating shaft as in the constitution of FIG. 2(b), it is possible to facilitate the correspondence of the center of gravity of the rotating body with the center of gravity of the rotating shaft. By making the center of gravity position of rotating body 7 approximately correspondent in this manner, even when there is a shock from outside, the effects on the actuator apparatus resulting from this shock can be held to the minimum. This action will be explained using an embodiment.

Figure 2C:
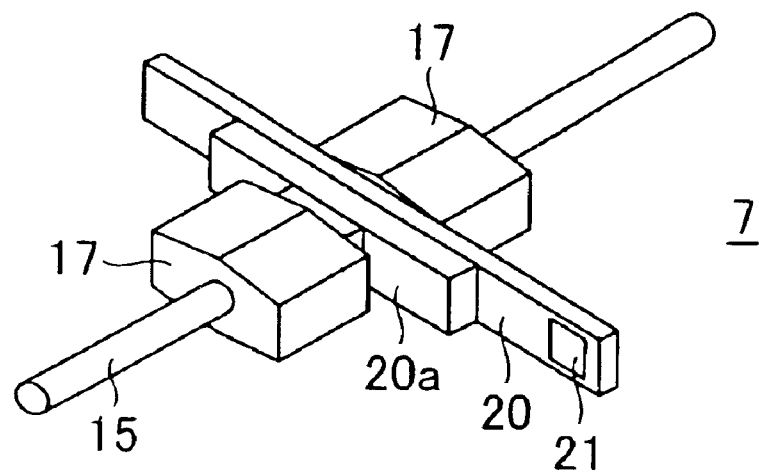

FIG. 2(c) is an exploded perspective view for illustrating another constitution of a rotating body of an actuator apparatus of the present invention. The same as in FIG. 2(a), the constitution of rotating body 7 is such that a rotating shaft 15 is inserted into a shaft opening of a rotor magnet 17, which comprises a permanent magnet, and integrally fastened using adhesive or the like, and a reflecting mirror 20 is held in a holding member 20a of duralumin, stainless steel or the like, and, together with this holding member 20a, is fastened via adhesive or the like to either rotating shaft 15 or rotor magnet 17 and integrated to the rotating shaft, such that the reflecting mirror surface 21 is perpendicular to the axial direction of the rotating shaft.

Figure 2D:
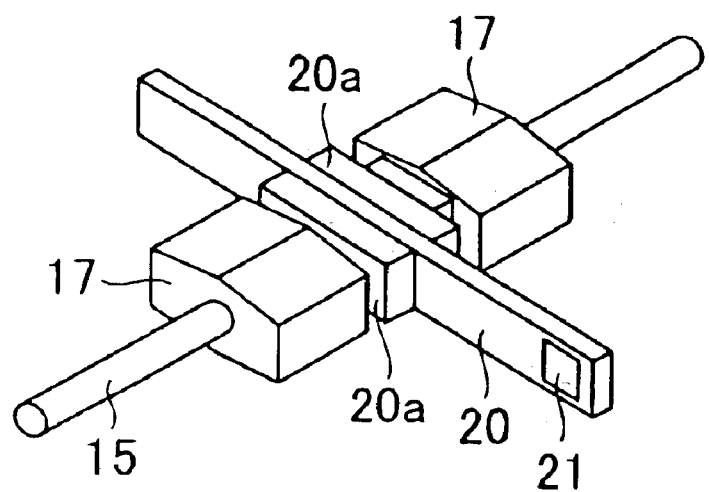

FIG. 2(d) is a constitution such that two holding members 20a, comprising the same shape and the same material, are disposed symmetrically on opposite sides of reflecting mirror 20, respectively, and even if the two holding members 20a should become deformed by changes in temperature, since a deformation that causes the reflecting mirror surface 21 to skew will be offset, the perpendicularity of the reflecting mirror surface 21 relative to the optical axis of the optical fibers can be maintained.

Figure 4:
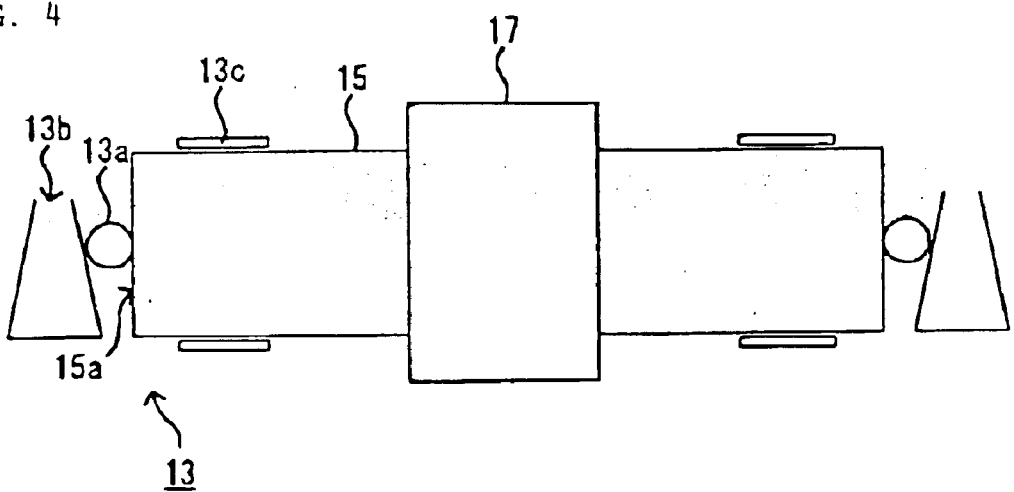
FIGS. 4(a) and 4(b) are diagrams showing examples of a constitution of a rotating body mounting of the present invention.
Figure 4:
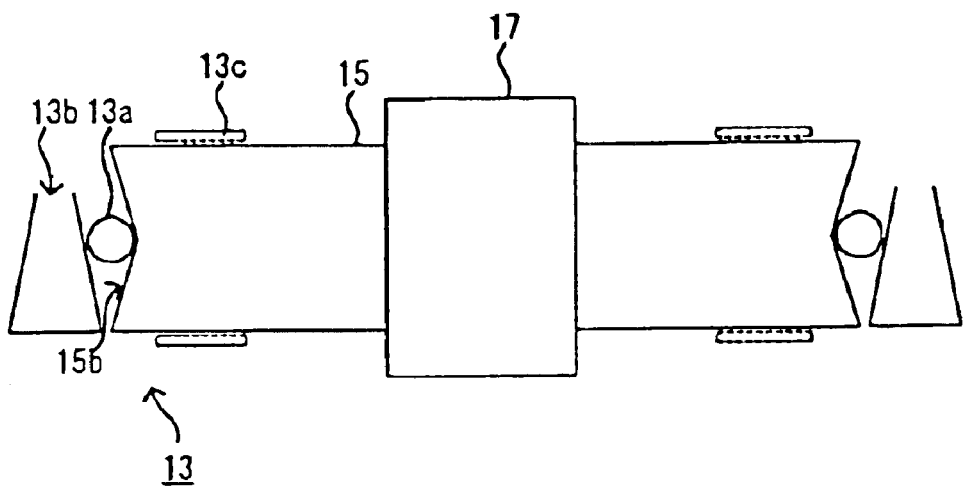
Figure 5:
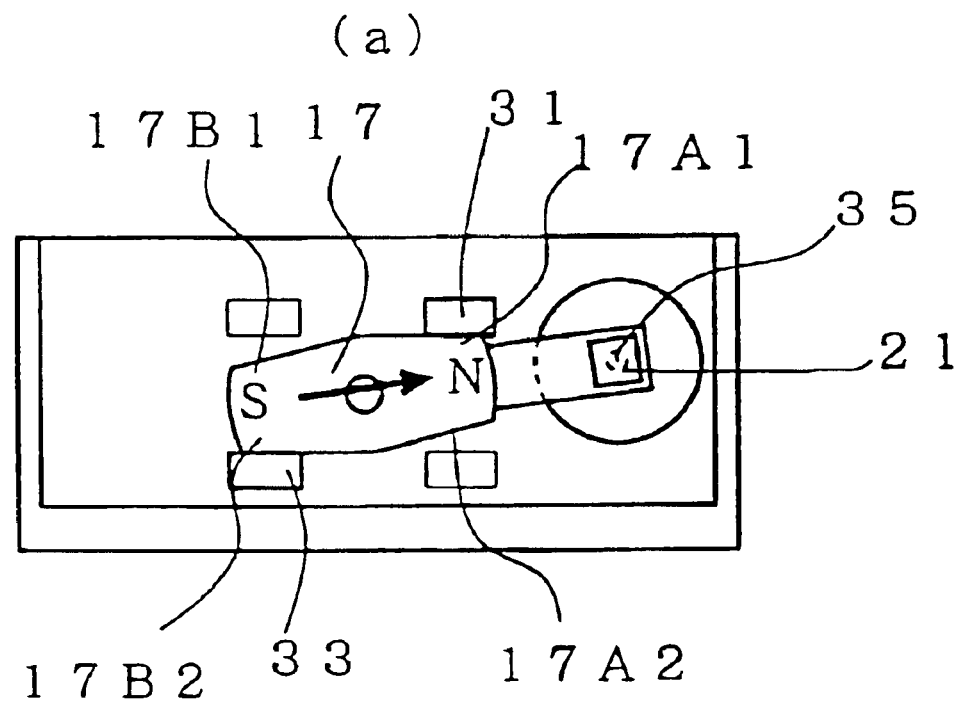
FIGS. 5(a) and 5(b) are structural cross-sectional views of an actuator portion for illustrating a first self-hold state in embodiment 1 of an actuator apparatus of the present invention.
Figure 5:
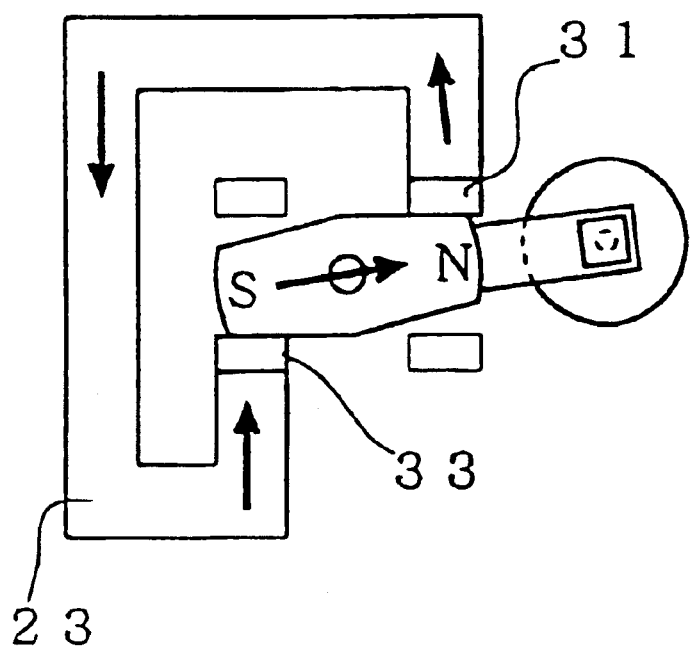
Figure 6:
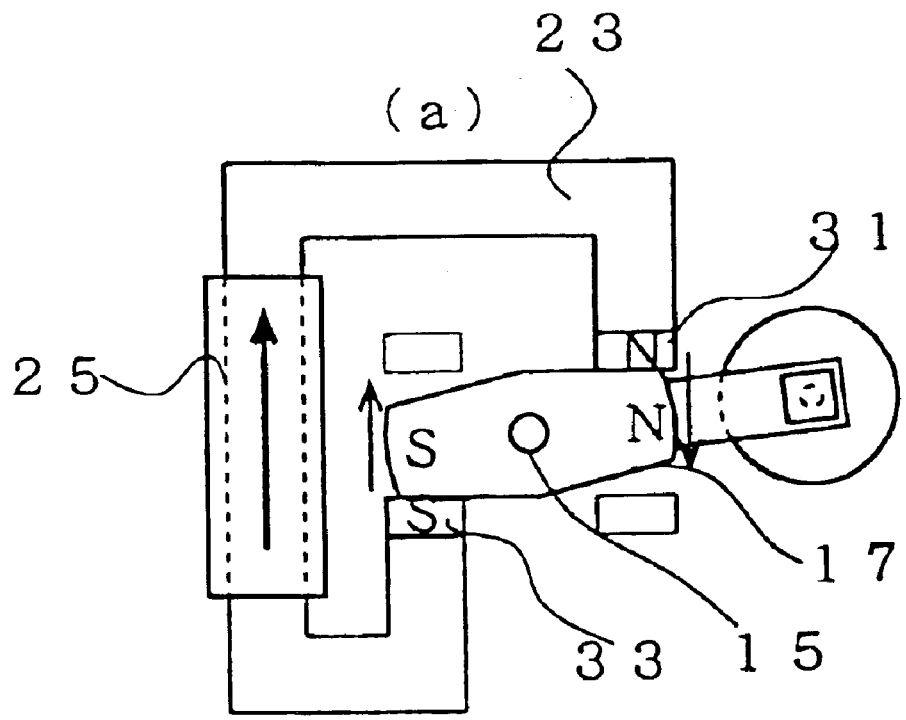
FIGS. 6(a) and 6(b) are circuit development schematics for illustrating the rotational operation of a rotating body from a first rotational position to a second rotational position in embodiment 1 of an actuator apparatus of the present invention.
Figure 6:
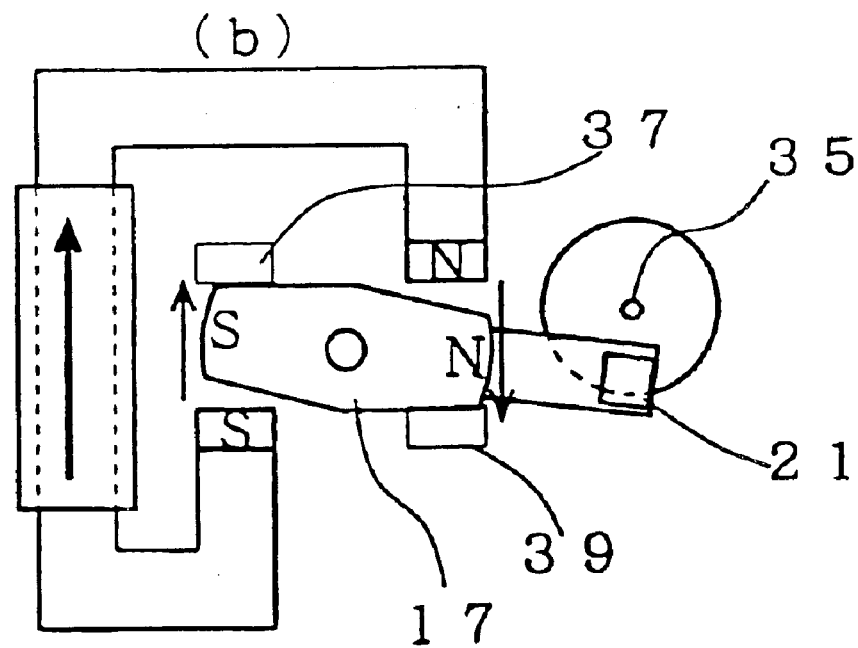
Figure 7:
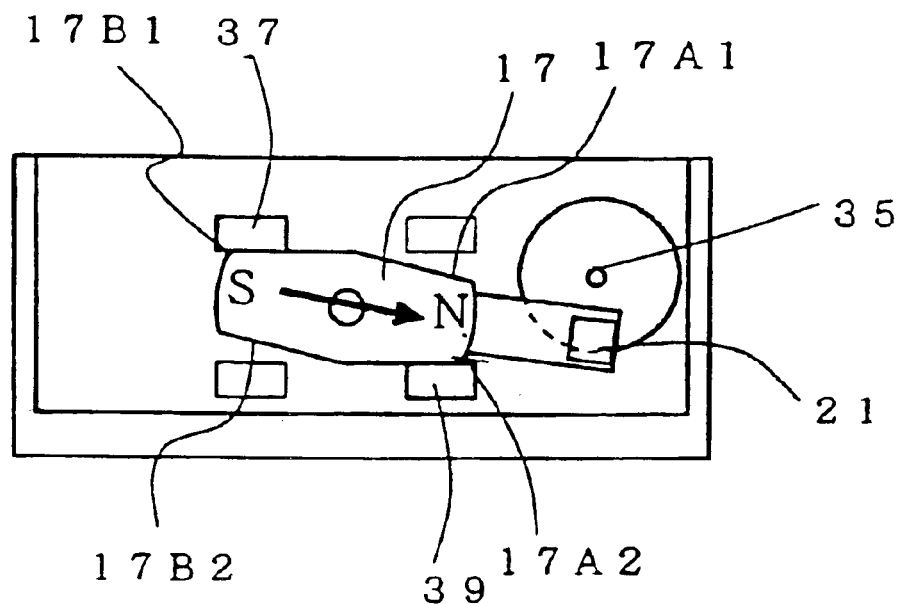
FIGS. 7(a) and 7(b) are structural cross-sectional views of an actuator portion for illustrating a second self-hold state in embodiment 1 of an actuator apparatus of the present invention.
Figure 7:
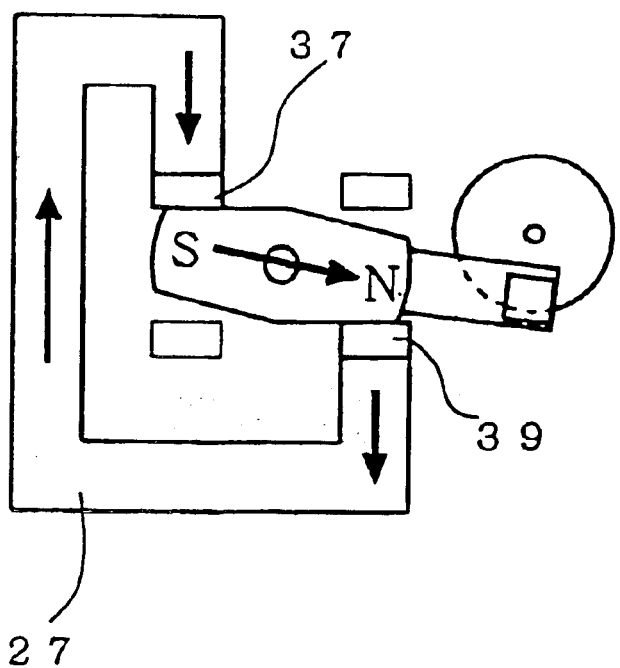

Then, a coating process or plating process for reducing wear can be carried out in the area of the rotating body mounting 13 of the rotating shaft 15. FIG. 4 shows an example of the constitution of rotating body mounting 13. In the example of the constitution shown in FIGS. 4(a), (b), rotating body mounting 13 comprises balls 13a and elastic members 13b for providing support in the direction of thrust, and sleeves 13c for providing support in the radial direction. Balls 13a make contact with the end portions 15a of rotating shaft 15, and the elastic forces of elastic members 13b apply pressure in the axial direction. Accordingly, rotating shaft 15 is supported in the direction of thrust at both ends thereof. Further, sleeves 13c are arranged on the periphery of rotating shaft 15, and support rotating shaft 15 in the radial direction.

The faces of rotating shaft 15 can either be made planar like the faces 15a shown in FIG. 4(a), or they can be made into diagonal faces, which are inclined toward the center of the shaft like the faces 15b shown in FIG. 4(b). According to the constitution of FIG. 4(b), since the balls 13a are constantly maintained at the shaft center of faces 15b, and can provide support in both the radial direction and thrust direction, sleeves 13c can be omitted.

Further, faces 15b can be made into curved convex surfaces, and coatings of a ceramic material can be applied to the surfaces thereof.

In this case, since there is no need to use lubricating oil, it is possible to eliminate a factor of reduced reliability, such as the adherence of an oil film on the reflecting mirror surface 21.

An actuator apparatus of the present invention was described as one example of a constitution applied to an optical switch as described hereinabove, but an actuator apparatus of the present invention is not limited to this optical switch field, and is a technology that can be applied to all switching mechanisms requiring repeatability of switching functions, apparatus durability, compactness and low power consumption.

(Embodiment 1)

The operation of actuator portion 5, when an actuator apparatus of the present invention is applied to an optical switch, will be explained hereinbelow by using FIG. 5 through FIG. 9.

First, a first self-hold state in a first rotational position will be explained initially. FIG. 5(a) is a cross-sectional view of the actuator portion in the vicinity of the rotor magnet for illustrating a first self-hold state, and FIG. 5(b) is a circuit development schematic of an actuator apparatus constituting a first self-hold state of the above-mentioned constitution. Furthermore, it is supposed that the rotor magnet is polarized at two poles in the direction shown in FIG. 5(a).

As shown in FIG. 5(a), the one end 31 of the first yoke is located in the vicinity of the diagonal face 17A1 of the N pole of a rotor magnet of the reference numeral 17, and the other end 33 of the first yoke is located in the vicinity of diagonal face 17B2 of the S pole of the above-mentioned rotor magnet. Then, as shown in FIG. 5(b), magnetic flux generated from the N pole of the rotor magnet flows from the one end 31 of the first yoke through the first yoke 23 to the other end 33 of the first yoke. Or, a magnetic flux is generated from the S pole in the direction of the N pole on the inside of the rotor magnet. Accordingly, a closed magnetic circuit, in which magnetic flux flows in the direction of the arrows, is formed, enabling a first self-hold state to be achieved via the magnetic force of rotor magnet 17. At this time, if, for example, reflecting mirror surface 21 is put into a state wherein it overlaps with the light path 35 in the first self-hold state in the first rotational position, it will become a state, wherein the light of the optical fibers is reflected by the reflecting mirror surface.

Next, the operation of an actuator of the present invention from the first rotational position to the second rotational position will be explained. FIG. 6(a) is a schematic view of circuit development in the vicinity of the rotor magnet in the first rotational position, for illustrating the rotational operation of the rotor magnet from the first rotational position to the second rotational position, and FIG. 6(b) is a schematic view of circuit development in the second rotational position subsequent to the above operation.

As shown in FIG. 6(a), in the first rotational position, power is supplied to first exciting coil 25 such that the one end 31 of the first yoke constitutes the N pole, and the other end 33 of the first yoke constitutes the S pole. Thus, magnetic flux is generated in the direction of the arrows by first exciting coil 25, and the N pole is formed at the one end 31 of the first yoke, and the S pole is formed at the other end 33 of the first yoke. By forming these poles, a repulsing force is generated between the N pole of the one end 31 of the first yoke and the N pole of rotor magnet 17, and, at the same time, a repulsing force is also generated between the S pole of the other end 33 of the first yoke and the S pole of rotor magnet 17. Therefore, rotor magnet 17 generates a clockwise turning force having rotating shaft 15 as the center of rotation, and, as shown in FIG. 6(b), rotor magnet 17 rotates until it comes in contact with the one end 37 of the second yoke and the other end 39 of the second yoke (until the second rotational position), and stops.

At this point, if the power to first exciting coil 25 is shut off subsequent to rotor magnet 17 having been rotated, since a magnetic attracting force is exerted between the S pole of rotor magnet 17 and the one end 37 of the second yoke, and a magnetic attracting force is exerted between the N pole of rotor magnet 17 and the other end 39 of the second yoke, respectively, a second self-hold state can be achieved.

In this manner, by supplying power to first exciting coil 25, and generating poles that repulse these rotor magnet poles at both ends of first yoke 23, rotor magnet 17 can be rotated from the first rotational position to the second rotational position. Furthermore, power needs to be supplied to first exciting coil 25 in only one direction when rotating from the first rotational position to the second rotational position, making the constitution of the driving circuit simple.

Next, the second self-hold state in the second rotational position will be explained. FIG. 7(a) is a schematic cross-sectional view of the vicinity of the rotor magnet in the second rotational position for illustrating the second self-hold state, and FIG. 7(b) is a schematic view of circuit development in the vicinity of the rotor magnet comprising a second self-hold state of the above constitution.

As shown in FIG. 7(a), the one end 37 of the second yoke is located in the vicinity of the diagonal face 17B1 of the S pole of a rotor magnet of the reference numeral 17, and the other end 39 of the second yoke is located in the vicinity of diagonal face 17A2 of the N pole of the rotor magnet. Then, as shown in FIG. 7(b), magnetic flux generated from the N pole of the rotor magnet flows from the other end 39 of the second yoke through the second yoke 27 in the direction of the one end 37 of the second yoke. Or, a magnetic flux is generated from the S pole in the direction of the N pole on the inside of the rotor magnet. Accordingly, a closed magnetic circuit, in which magnetic flux flows in the direction of the arrows, is formed, constituting a second self-hold state in accordance with the magnetic force of rotor magnet 17. Furthermore, if a second self-hold state is created in a second rotational position relative to the above-mentioned first rotational position at this time, it will be a state, wherein reflecting mirror surface 21 deviates from light path 35, and the light of the optical fibers constitutes a transmission state.

Next, the operation from the second rotational position to the first rotational position will be explained. FIG. 8(a) is a schematic view of circuit development in the vicinity of the rotor magnet in the second rotational position, for illustrating the rotational operation of the rotor magnet from the second rotational position to the first rotational position, and FIG. 8(b) is a schematic view of circuit development in the first rotational position subsequent to the above operation.

As shown in FIG. 8(a), in the second rotational position, power is supplied to second exciting coil 29 such that the one end 37 of the second yoke constitutes the S pole, and the other end 39 of the second yoke constitutes the N pole. Thus, magnetic flux is generated in the direction of the arrows by second exciting coil 29, and the S pole is formed at the one end 37 of the second yoke, and the N pole is formed at the other end 39 of the second yoke. By forming these poles, a repulsing force is generated between the S pole of the one end 37 of the second yoke and the S pole of rotor magnet 17, and, at the same time, a repulsing force is also generated between the N pole of the other end 39 of the second yoke and the N pole of rotor magnet 17. Therefore, rotor magnet 17 generates a counterclockwise turning force having rotating shaft 15 as the center of rotation, and, as shown in FIG. 8(b), rotor magnet 17 rotates until it comes in contact with the one end 31 of the first yoke and the other end 33 of the first yoke (until the first rotational position), and stops.

At this point, if the power to second exciting coil 29 is shut off subsequent to rotor magnet 17 having been rotated, since a magnetic attracting force is exerted between the N pole of rotor magnet 17 and the one end 31 of the first yoke, and a magnetic attracting force is exerted between the S pole of rotor magnet 17 and the other end 33 of the first yoke, respectively, the first self-hold state can once again be achieved.

When rotating body 7 is rotated from the second rotational position to the first rotational position like this, power is supplied only to second exciting coil 29, and the same as the explanation of the operation when rotating body 7 is rotated from the first to the second rotational position, it is possible to rotate the above-mentioned rotating body 7 by only supplying power to one exciting coil.

Figure 9:
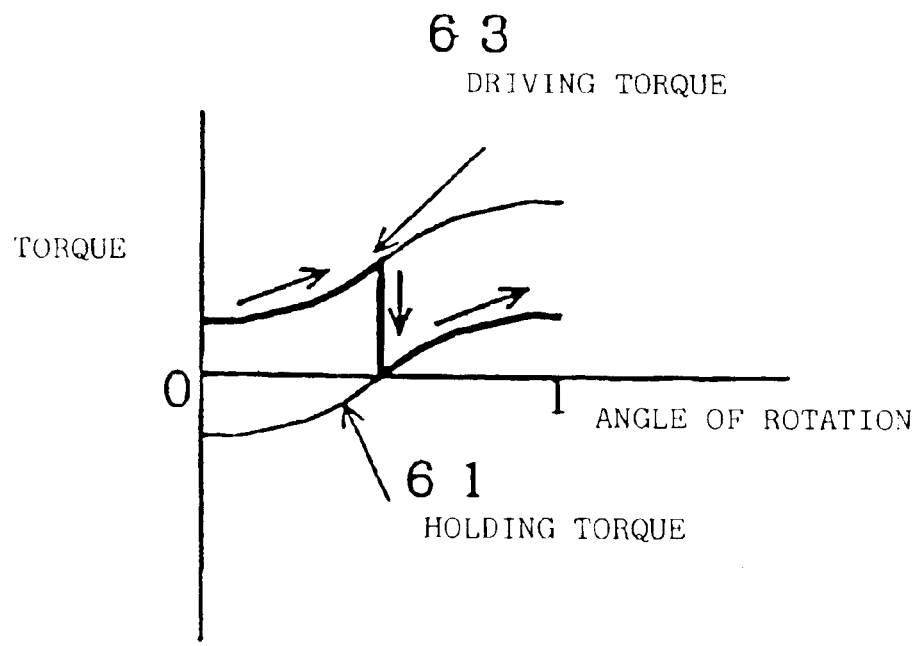
FIG. 9 is a diagram for illustrating the torque required for driving an actuator apparatus of the present invention.

Here, a method for supplying power to an exciting coil arranged in a yoke will be considered on the basis of data on the driving torque required when rotating the above-mentioned rotating body 7 between the first rotational position and the second rotational position. FIG. 9 is a graph for illustrating the torque required to drive an actuator apparatus of the present invention, showing angle of rotation along the horizontal axis, and torque along the vertical axis.

Reference numeral 61 of this graph indicates the holding torque curve acting on the rotating body when power is not supplied to first exciting coil 25, and reference numeral 63 indicates the driving torque curve acting on the rotating body that occurs when power is supplied to first exciting coil 25.

First, a case in which rotating body 7 is rotated from the first rotational position to the second rotational position will be explained using an example. In FIG. 9, if the first rotational position is assumed to have an angle of rotation of 0, and the second rotational position is assumed to have an angle of rotation of 1, it is clear that holding torque curve 61 switches from negative to positive torque in between the first rotational position and the second rotational position. In accordance therewith, in an actuator apparatus of the present invention, when the rotating body is close to the first rotational position, the torque that attempts to maintain the first self-hold state continues to operate, and when the rotating body is close to the second rotational position, the torque that attempts to maintain the second self-hold state operates. The torque acting on the rotating body represents the sum of the holding torque and the driving torque, which is generated when power is supplied to the first exciting coil. Therefore, when rotating body 7 is rotated from the first rotational position to the second rotational position, as indicated by the dark line in FIG. 9, power can be supplied to first exciting coil 25 up until the vicinity where the rotating body passes the intermediate point between the first rotational position and the second rotational position, which is the point at which the sign of the holding torque changes, and from that position until the second rotational position, rotating body 7 can be rotated by the magnetic attracting force of rotor magnet 17 and second yoke 27 even if power to first exciting coil 25 is shut off.

Furthermore, as the state, wherein power to first exciting coil 25 is shut off, either a short-circuit state or an open state can be considered for the coil terminal connection of the first and second exciting coils. Further, when supplying power to first exciting coil 25, it is desirable for second exciting coil 29 to assume an open state. Then, subsequent to this rotor magnet 17 and second yoke 27 either making contact or coming very close to one another, the second self-hold state can be achieved in a state, wherein power is not being supplied.

Since the same operation is performed for rotation from the second to the first rotational position as was performed in the case of rotation from the first to the second rotational position explained hereinabove, except in reverse order, this explanation will be omitted herein.

Figure 10:
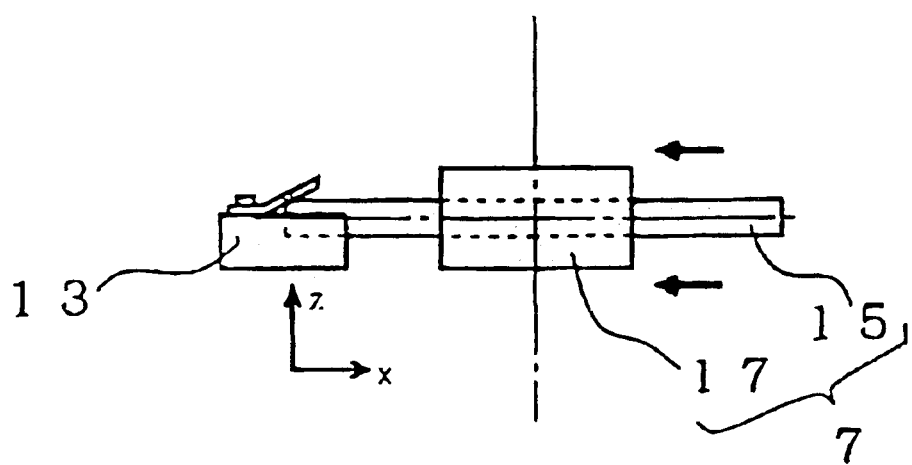
FIG. 10 is a diagram for illustrating shock resistance when an external force is applied from the direction of the X axis in embodiment 1 of an actuator apparatus of the present invention.

Next, an actuator apparatus of the present invention will be explained from the standpoint of having a structure that features excellent shock resistance, using FIG. 10 through FIG. 12. FIG. 10 is a diagram for illustrating shock resistance when an external force is applied to a rotating body 7, comprising a rotating shaft 15 and a rotor magnet 17, from the axial direction of this rotating shaft 15, and shows a schematic view of the vicinity of the rotor magnet as seen from the horizontal direction relative to the base of the main body. Furthermore, direction X of FIG. 10 will be explained as the direction parallel to rotating shaft 15, and direction Z will be explained as the direction perpendicular to the main body 1.

As shown in FIG. 10, even if an external force (the arrows in the figure) is applied from the direction of the X axis, if the constitution is made such that the location of the center of gravity of rotor magnet 17 and the location of the center of gravity of rotating shaft 15 are made approximately correspondent as in the present invention, a moment resulting from an external force is not substantially generated, and this external force can be communicated to rotating body mounting 13 via rotating shaft 15, and absorbed by this rotating body mounting 13. An actuator apparatus of the present invention thus excels in shock resistance relative to a force from the X-axis direction.

For the rotating shaft 15 bearing portion of rotating body mounting 13, a bearing portion, which provides either a cross-sectional V-shape or erect walls on both sides of a flat surface, and which applies either a fluororesin-distributed polyamide imide resin or a phenol resin to this bearing face, can be used.

Further, rotating shaft 15 is plated with nickel comprising 20% fluororesin.

Next, shock resistance relative to a force from the Y-axis direction will be explained. FIG. 11(*a*) is a diagram for illustrating shock resistance when an external force is applied from the above-mentioned Y-axis direction to a rotating body 7 comprising a rotating shaft 15 and a rotor magnet 17, and shows a schematic view of the vicinity of the rotor magnet as seen from the Z-axis direction. FIG. 11(*b*) is a schematic view of the vicinity of the rotor magnet as seen from the Y-axis direction in the above-mentioned constitution.

Figure 11:
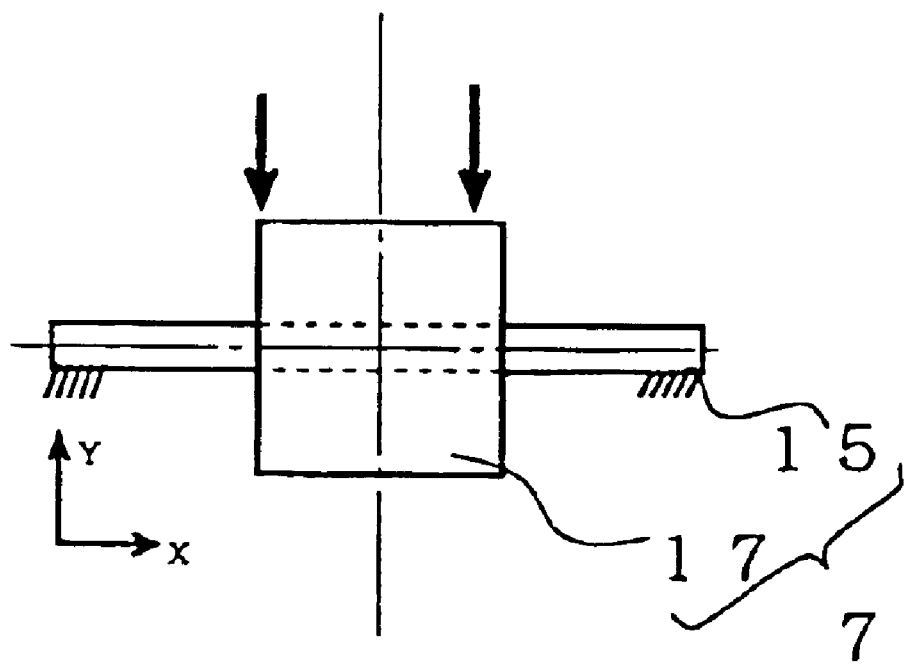
FIGS. 11(a) and 11(b) are diagrams for illustrating shock resistance when an external force is applied from the direction of the Y axis in embodiment 1 of an actuator apparatus of the present invention.
Figure 11:
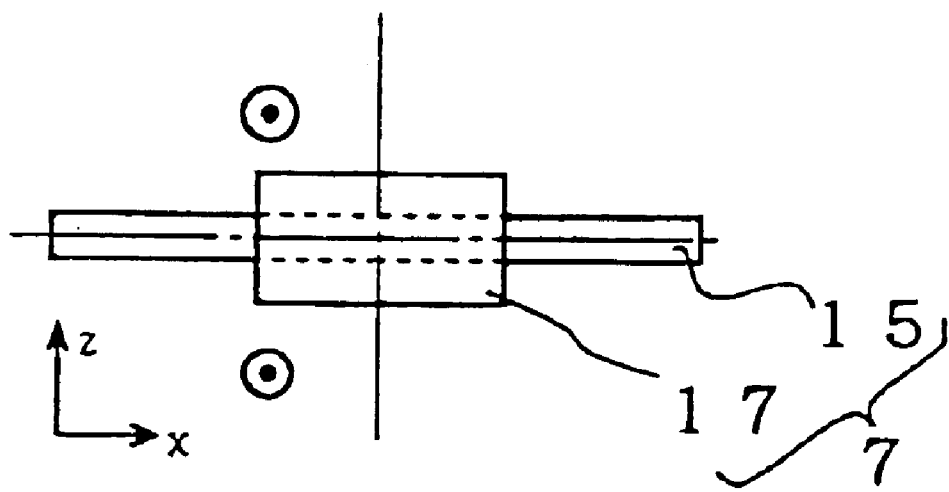

As shown in FIG. 11(*a*), even when an external force (arrows in the figure) is applied from the Y-axis direction, both ends of the rotating shaft 15 are supported by rotating body mountings (not shown in the figure). Further, when considered from the direction shown in FIG. 11(*b*), since the location of the center of gravity of rotor magnet 17 and the location of the center of gravity of rotating shaft 15 have been made approximately correspondent, it is clearly a structure in which an angular moment resulting from an external force from the Y-axis direction does not act on rotating body 7. Furthermore, in FIG. 11(*b*), the dots in the figure indicate the direction of an external force, indicating a direction of force from the back side of the figure toward the front side.

Next, shock resistance relative to a force from the Z-axis direction will be explained. FIG. 12(*a*) is a diagram for illustrating shock resistance when an external force is applied from the above-mentioned Z-axis direction to a rotating body 7 comprising a rotating shaft 15 and a rotor magnet 17, and shows a schematic view of the vicinity of the rotor magnet as seen from the direction of the Y axis. Further, FIG. 12(*b*) is a schematic view of the vicinity of the rotor magnet as seen from the direction of the Z axis in the above-mentioned constitution.

Figure 8:
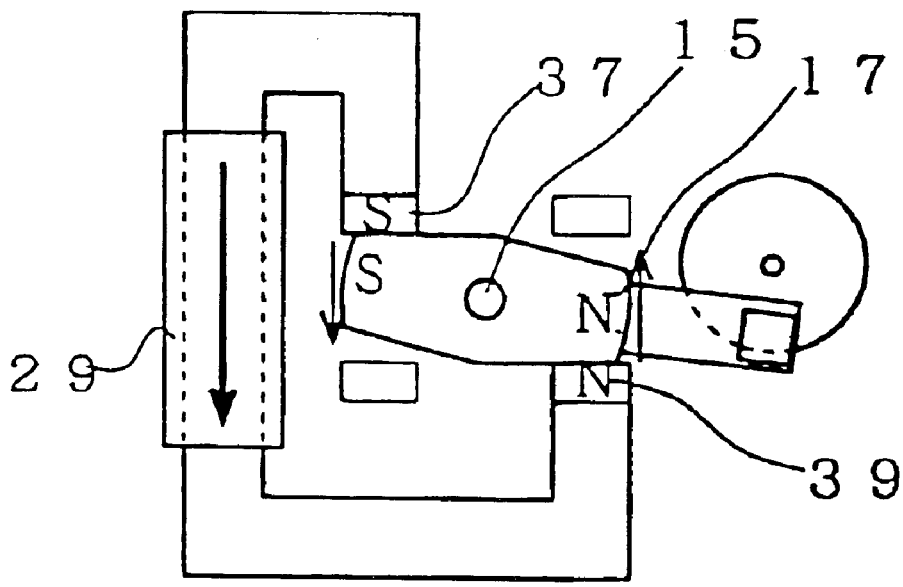
FIGS. 8(a) and 8(b) are circuit development schematics for illustrating the rotational operation of a rotating body from a second rotational position to a first rotational position in embodiment 1 of an actuator apparatus of the present invention.
Figure 8:
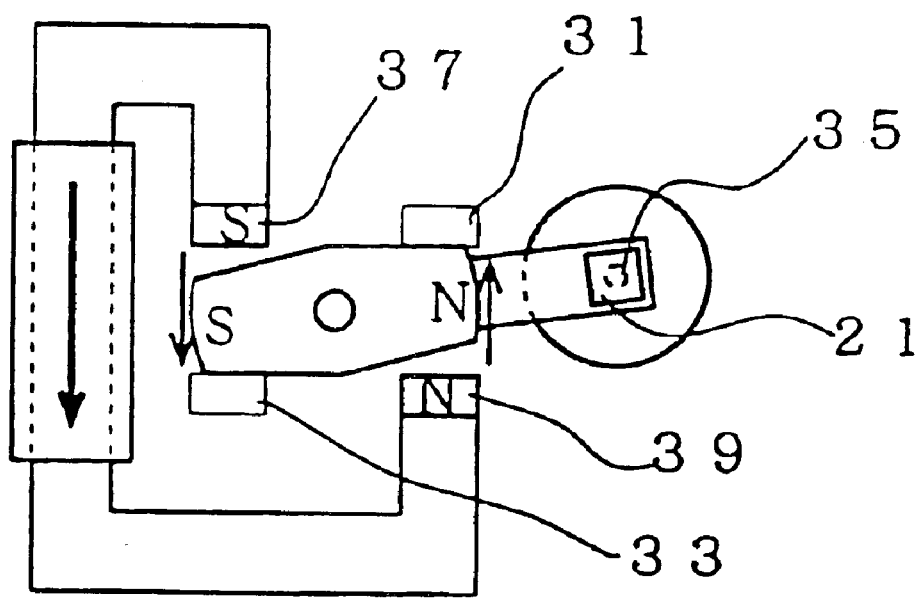
Figure 12:
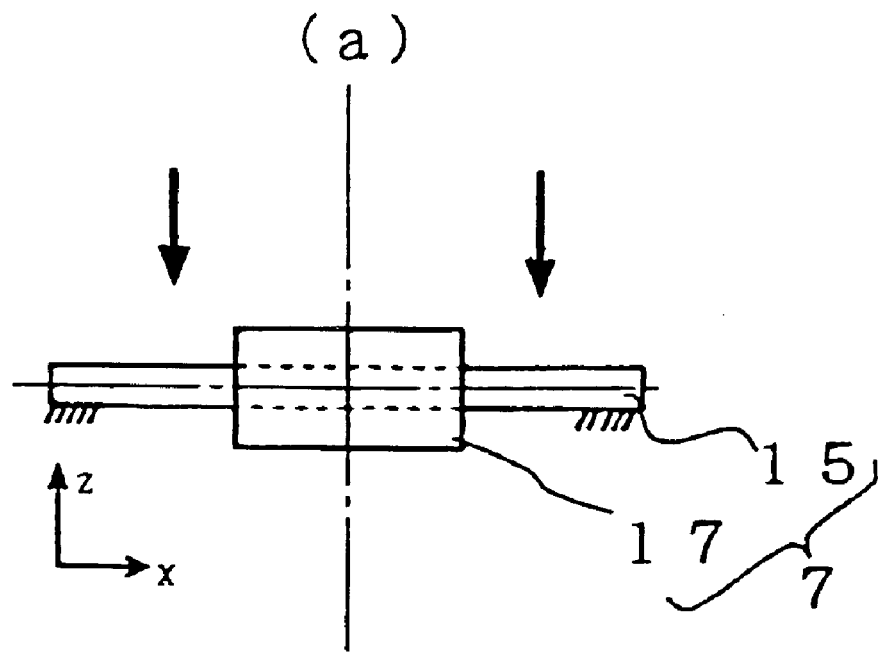
FIGS. 12(a) and 12(b) are diagrams for illustrating shock resistance when an external force is applied from the direction of the Z axis in embodiment 1 of an actuator apparatus of the present invention.
Figure 12:
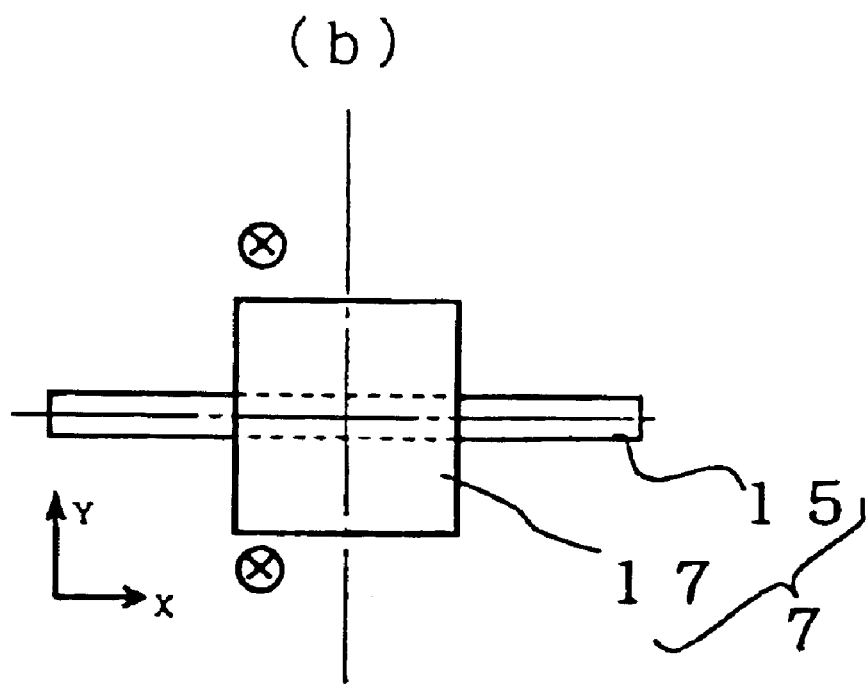

As shown in FIG. 12(*a*), when an external force (arrows in the figure) is applied from the Z-axis direction, both ends of the rotating shaft 15 are supported by rotating body mountings (not shown in the figure) the same as in FIGS. 8 and 9. Further, when considered from the direction shown in FIG. 12(*b*), since the location of the center of gravity of the rotating body and the location of the center of gravity of rotating shaft have been made approximately correspondent, it is clearly a structure in which an angular moment resulting from an external force from the Z-axis direction does not act on rotating body 7. Furthermore, in FIG. 12(*b*), the dots in the figure indicate the direction of an external force, indicating a direction of force from the front side of the figure toward the back side.

As explained hereinabove, an actuator apparatus according to Embodiment 1, in the first and second rotational positions, constitutes a closed magnetic circuit resulting from a magnetic circuit in accordance with a yoke and a magnet. In this constitution, since the gap part in the magnetic circuit is insignificant, magnetic resistance is small. Furthermore, it is a constitution, whereby even if the volume of the magnet is reduced and the magnetic force of the magnet is weakened, the desired holding force can still be achieved. Further, since this constitution can reduce the moment of inertia of rotating body 7 by shortening the diameter of the rotating body in the direction perpendicular to the axial direction of the rotating body, it is possible to reduce the current value applied to an exciting coil as less torque is required at the time of rotation, making the low power consumption effect great. Accordingly, an actuator apparatus of the present invention has switching functions, which can stably move reflecting mirror surface 21 of reflecting mirror 20 mounted to rotor magnet 17 into and out of the gap of the optical fibers, and which has extremely good repeatability.

Furthermore, since rotating body 7 can absorb a shock via the rotating body mountings, and the first and second rotational positions are held by a closed magnetic circuit, there is no need to purposely generate via an exciting coil enough force to ensure shock resistance in a holding state, as with the prior art. Accordingly, the power consumption of an actuator apparatus of the present invention supplies an exciting coil with only the quantity of power needed for driving. Moreover, since this constitution makes the location of the center of gravity of rotating body 7 approximately correspondent to the location of the center of gravity of rotating shaft 15, shock resistance is good, and a new angular moment is not generated even when an external force is applied.

(Embodiment 2)

An actuator apparatus, which is an aspect of another embodiment of the present invention, will be explained using FIG. 13. This constitution is an especially effective constitution when even faster switching is required, or when it is necessary to save space.

The difference from Embodiment 1 is that, when switching from the first to the second self-hold state, Embodiment 2 supplies power to the first exciting coil 25 and the second exciting coil 29 simultaneously. In other words, the difference is that, when switching from the first rotational position to the second rotational position, a pole for attracting rotor magnet 17 is generated on second yoke 27 at the same time that a pole for repulsing rotor magnet 17 is generated on first yoke 23, or, conversely, when switching from the second rotational position to the first rotational position, a pole for repulsing rotor magnet 17 is generated on second yoke 27 at the same time that a pole for attracting rotor magnet 17 is generated on first yoke 23. Accordingly, an actuator apparatus of this constitution performs switching in accordance with three control states when carrying out switching operations, such that the coil terminal connections of the first and second exciting coils are controlled by either a short-circuit state or an open state, and control for changing the orientation of a current. In this Embodiment 2, because the two forces of a repulsing force and an attracting force are utilized, rotor magnet 17 can be rotated even if the magnetic flux excited by one exciting coil is less than that of an exciting coil used in Embodiment 1. Thus, if the constitution of Embodiment 2 is applied, although the driving method becomes complicated, the volume of each exciting coil can be reduced, and space saving can be expected.

The operation of the actuator portion 5 of this Embodiment 2 will be explained. FIG. 13(*a*) is a diagram for illustrating the rotational operation of the rotor magnet from the first rotational position to the second rotational position, and it shows a schematic view of circuit development in the vicinity of the rotor magnet when utilizing repulsing action and attracting action on the rotor magnet in the first rotational position. FIG. 13(*b*) shows a schematic view of circuit development in the vicinity of the rotor magnet when utilizing repulsing action and attracting action on the rotor magnet in the second rotational position of the above-mentioned constitution.

In Embodiment 2, first, in the first rotational position, power is supplied to the first exciting coil 25 such that the one end 31 of the first yoke constitutes the N pole, and the other end 33 of the first yoke constitutes the S pole, and further, power is supplied to the second exciting coil 29 such that the one end 37 of the second yoke constitutes the N pole, and the other end 39 of the second yoke constitutes the S pole. By so doing, a repulsing force is generated between the N pole of the one end 31 of the first yoke and the N pole of rotor magnet 17, and, in addition, a repulsing force is also generated between the S pole of the other end 33 of the first yoke and the S pole of rotor magnet 17. And at the same time as this, an attracting force is generated between the N pole the one end 37 of the second yoke and the S pole of rotor magnet 17, and, in addition, an attracting force is generated between the S pole of the other end 39 of the second yoke and the N pole of rotor magnet 17. Therefore, in FIG. 13(*a*), rotor magnet 17 generates a clockwise turning force having rotating shaft 15 as the center of rotation, and rotor magnet 17 rotates until it comes in contact with the one end 37 of the second yoke and the other end 39 of the second yoke (until the second rotational position), and stops. FIG. 14(*a*) shows the timing of the voltages applied to the first exciting coil 25 and the second exciting coil 29 at this time, and the magnetic forces thereof.

Figure 13:
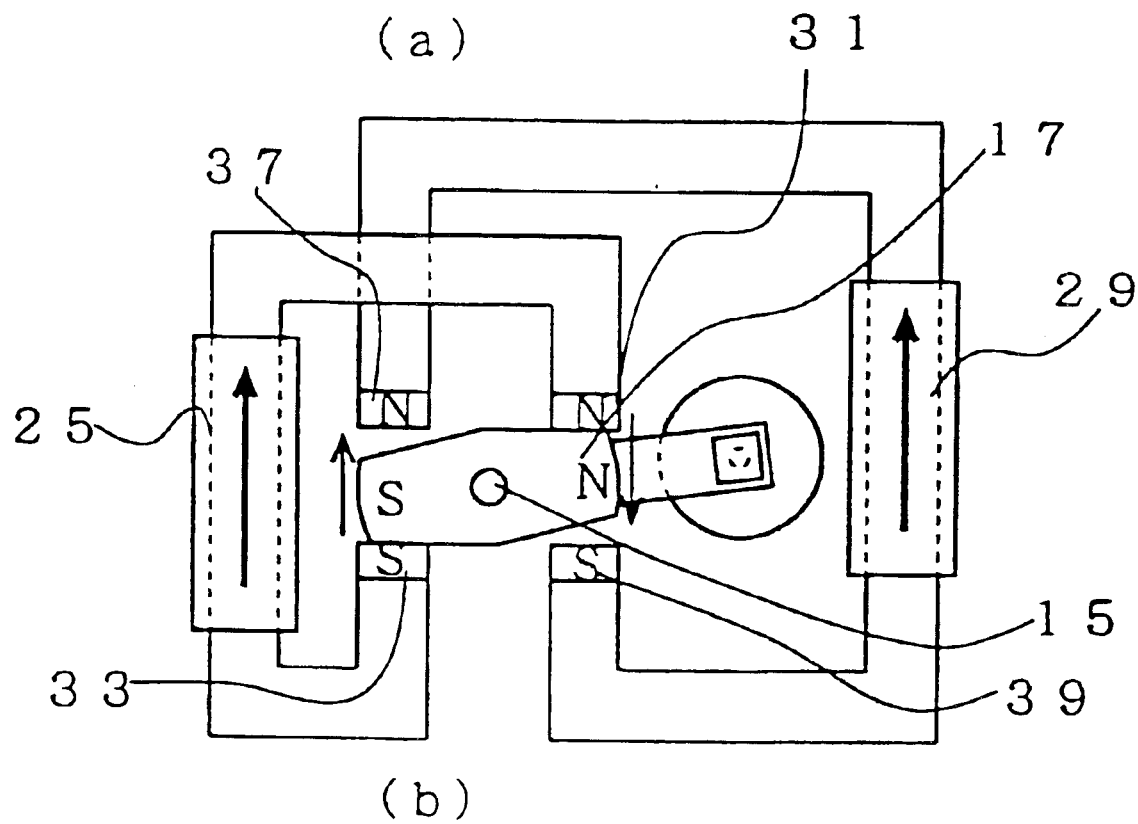
FIGS. 13(a) and 13(b) are circuit development schematics for illustrating rotational operation from a first rotational position to a second rotational position in embodiment 2 of an actuator apparatus of the present invention.
Figure 14:
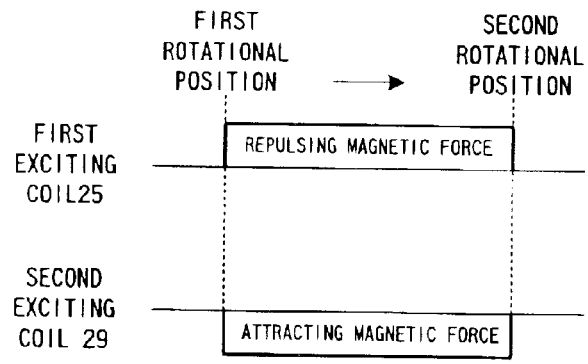
FIGS. 14(a) through 14(d) show the timing of voltages applied to a first exciting coil and second exciting coil of the present invention, and the magnetic forces thereof.
Figure 14:
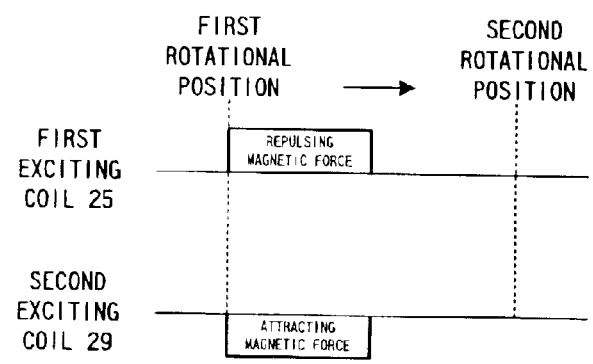
Figure 14:
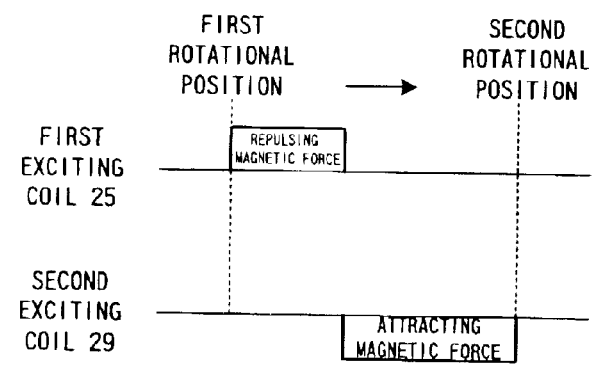
Figure 14:
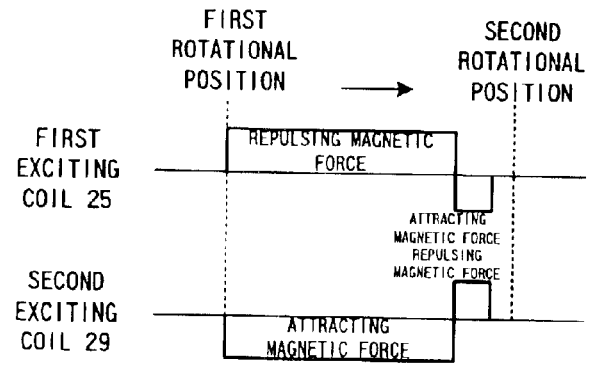

The operation from the second rotational position to the first rotational position can be carried out by attracting and repulsing actions between the first and second yokes relative to rotor magnet 17 the same as explained hereinabove by reversing the direction of the power supplied to the first exciting coil 25 and the second exciting coil 29 as shown in FIG. 13(*b*).

Further, if the power supplies to the first exciting coil 25 and second exciting coil 29 are stopped in the vicinity where the rotor magnet 17 passes the intermediate point between the first rotational position and the second rotational position, since a magnetic attracting force is exerted between the N pole of the rotor magnet 17 and the other end 39 of the second yoke, and at the same time as this, a magnetic attracting force is exerted between the S pole of the rotor magnet and the one end 37 of the second yoke, the second self-hold state can be achieved at the point in time when the above-mentioned rotor magnet and yokes come in contact. This kind of driving method can also drive an actuator apparatus of Embodiment 2. FIG. 14(*b*) shows the voltages applied to the first exciting coil 25 and the second exciting coil 29 at this time, and the magnetic forces thereof.

Further, the driving method can also be such that, subsequent to causing rotor magnet 17 to rotate to a certain extent by generating poles for repulsing rotor magnet 17 at both ends of a yoke by supplying power to first exciting coil 25 in the first rotational position in FIG. 13(*a*), this rotor magnet 17 can be made to rotate to the second rotational position by generating poles for attracting rotor magnet 17 at both ends of a yoke by supplying power to second exciting coil 29. FIG. 14(*c*) shows the voltages applied to first exciting coil 25 and second exciting coil 29 at this time, and the magnetic forces thereof.

Furthermore, when the rotor magnet approaches the vicinity of the second rotational position, the intensity of the impact between the rotor magnet and the yoke can also be attenuated by having second exciting coil 29 generate a magnetic force at both ends of the yoke for repulsing this rotor magnet. FIG. 14(*d*) shows the voltages applied to first exciting coil 25 and second exciting coil 29 at this time, and the magnetic forces thereof.

Thus, according to the actuator apparatus shown in Embodiment 2, it is clearly possible to have a constitution, which, in addition to the effects of Embodiment 1, also enables switching to be carried out faster, and saves space.

(Embodiment 3)

Figure 15:
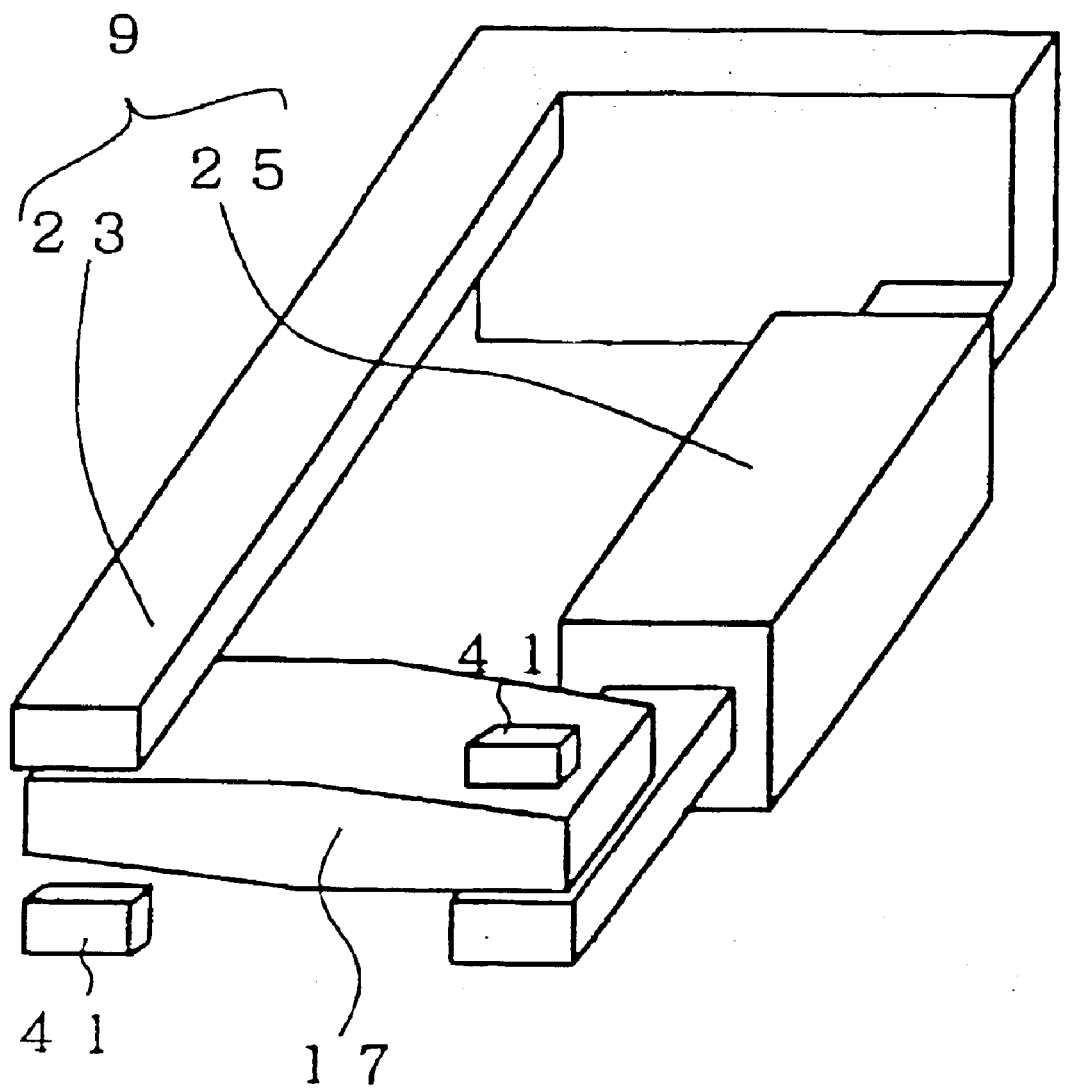
FIG. 15 is a perspective view for illustrating the structure in embodiment 3 of an actuator apparatus of the present invention.

As yet another aspect of the embodiment of the present invention, the actuator portion thereof will be explained using the perspective view of FIG. 15. This constitution is a constitution that is effective when it is desirable to make the actuator portion more compact.

The difference from Embodiment 1 is that the actuator portion 5 is constituted from only a first magnetic circuit and a rotating body 7. This first magnetic circuit 9 is the same constitution as that of Embodiments 1 and 2, and only the driving method thereof differs. Further, Embodiment 3 does not have a second magnetic circuit portion, and striking members for defining one rotational position are constituted from a non-magnetic material 41, such as plastic.

Figure 16:
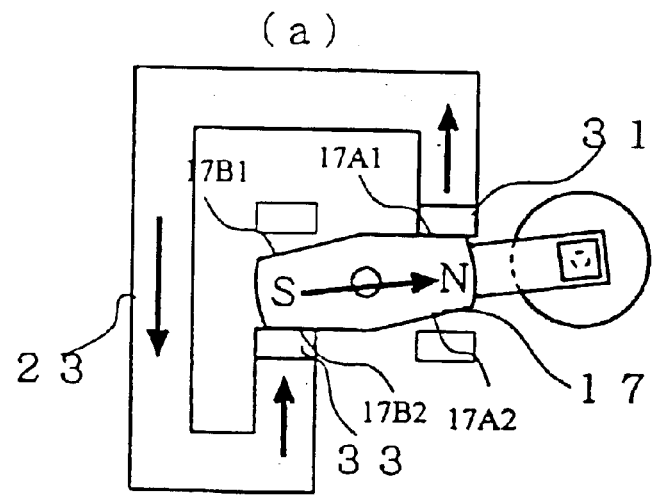
FIGS. 16(a), 16(b) and 16(c) are circuit development schematics for illustrating rotational operation from a first rotational position to a second rotational position in embodiment 3 of an actuator apparatus of the present invention.
Figure 16:
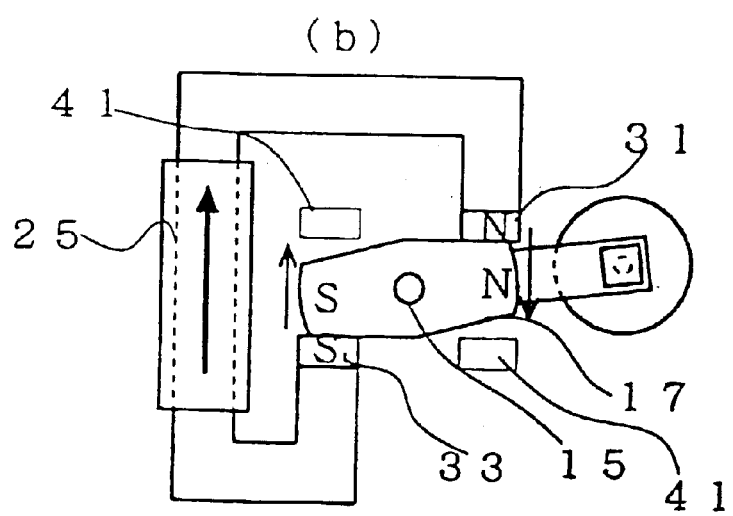
Figure 16:
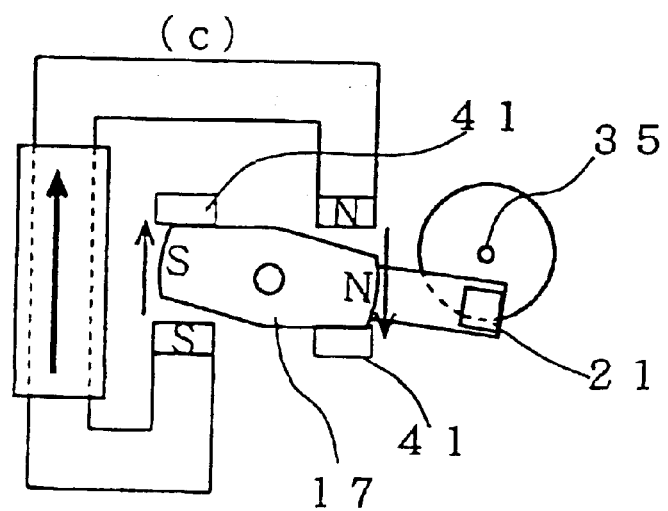

The operation of the actuator portion 5 of this Embodiment 3 will be explained. FIG. 16(a) is a circuit development schematic showing a first self-hold state in a first rotational position, FIG. 16(b) is a schematic view of circuit development in the vicinity of the rotor magnet when a repulsing action is generated relative to this rotor magnet in the first rotational position, for illustrating the rotational operation of the rotor magnet from the first rotational position to the second rotational position, and FIG. 16(c) is a schematic view of circuit development in the vicinity of the rotor magnet subsequent to moving to the second rotational position in the above-mentioned constitution. Furthermore, it is supposed that rotor magnet 17 is polarized at two poles in the direction shown in the figure.

The actuator portion of Embodiment 3, as shown in FIG. 16(a), is arranged such that the one end 31 of the first yoke is located in the vicinity of the diagonal face 17A1 of the N pole of rotor magnet 17, and the other end 33 of the first yoke is located in the vicinity of diagonal face 17B2 of the S pole of the rotor magnet. Then, magnetic flux generated from the N pole of rotor magnet 17 flows from the one end 31 of the first yoke through the first yoke 23 to the other end 33 of the first yoke, and thereby magnetic flux is also generated inside the rotor magnet in the direction from the S pole to the N pole. Accordingly, a closed magnetic circuit, in which magnetic flux flows in the direction of the arrows in the first rotational position, is formed, achieving a first self-hold state.

Next, as shown in FIG. 16(b), in the above-mentioned first rotational position, power is supplied to first exciting coil 25 such that the one end 31 of the first yoke constitutes an N pole, and the other end 33 of the first yoke constitutes an S pole. By so doing, a magnetic flux is generated in the direction of the arrows by first exciting coil 25, and a repulsing force is generated between the N pole of the one end 31 of the first yoke and the N pole of rotor magnet 17, and, at the same time, a repulsing force is also generated between the S pole of the other end 33 of the first yoke and the S pole of rotor magnet 17. Therefore, in FIG. 16(b), rotor magnet 17 generates a clockwise turning force having rotating shaft 15 as the center of rotation, and, as shown in FIG. 16(c), rotor magnet 17 rotates until it comes in contact with striking members 41 (until the second rotational position), and stops.

Since these striking members 41 are constituted of plastic or some other non-magnetic material, in this position, a second self-hold state is achieved by the rotor magnet 17 repulsing action formed by first magnetic circuit portion 9, without forming a closed magnetic circuit as in Embodiments 1 and 2. Accordingly, if the repulsing force of first magnetic circuit portion 9 is terminated, an attracting force is generated between the one end 31 and the other end 33 of the above-mentioned first yoke, and rotor magnet 17 is once again able to return to the first rotational position. In addition, the above-mentioned rotor magnet 17 can also be set to the first rotational position by applying a reverse polarity pulse and generating an attracting force between the yoke and rotor magnet 17. By applying a reverse polarity pulse in this manner, the return to the first self-hold state can be speeded up.

Accordingly, it was determined that, in addition to the effects of Embodiment 1, an actuator apparatus of Embodiment 3 can achieve the effects of the present invention with even fewer members.

(Embodiment 4)

Figure 17:
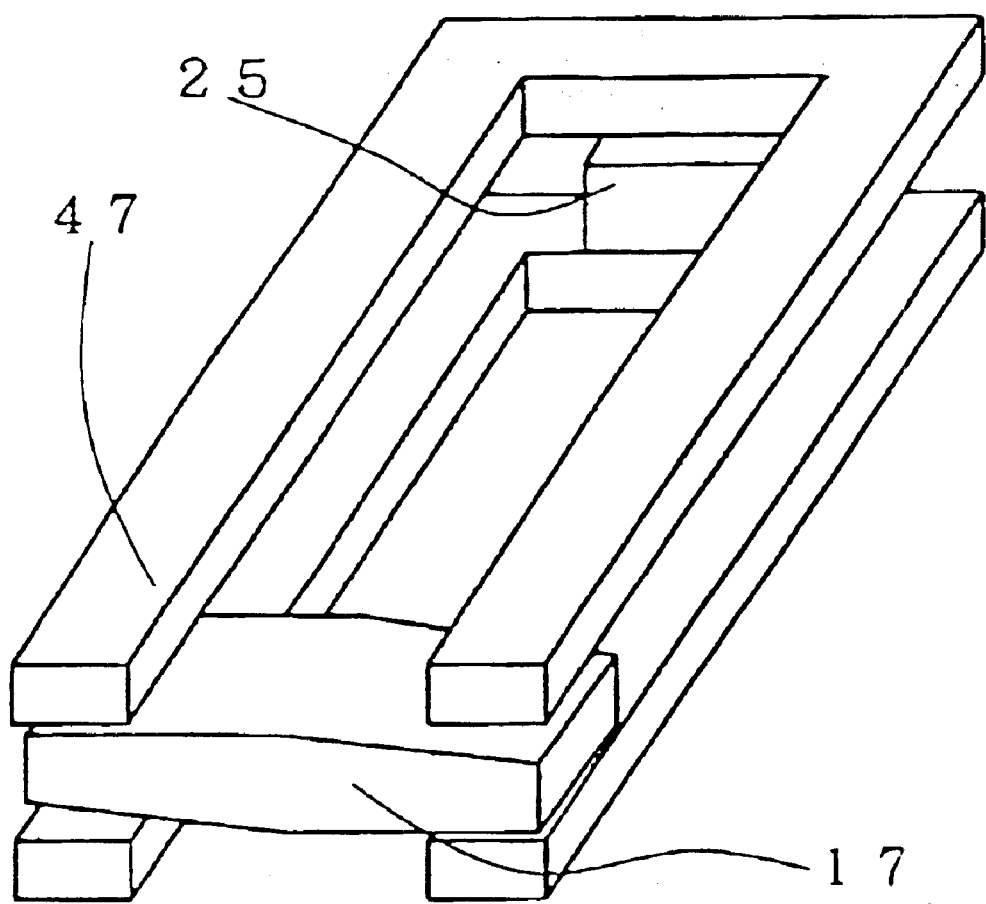
FIG. 17 is a perspective diagram for illustrating the structure in embodiment 4 of an actuator apparatus of the present invention.

As yet another aspect of the embodiment of the present invention, the actuator portion thereof will be explained using the perspective view of FIG. 17. The difference from Embodiment 1 is that the constitution is such that a first self-hold state and a second self-hold state can be achieved by switching the energization of one exciting coil. In FIG. 17, the constitution is such that first and second magnetic circuit portions, which are constituted by yokes 47 and a first exciting coil 25 rotate the above-mentioned rotor magnet 17, and to achieve a first and a second self-hold state in a first and a second rotational position, respectively, the ends of the yokes are arranged by opening spaces above and below the rotor magnet 17, and at least one exciting coil is arranged so as to enable prescribed poles to be generated at the ends of these yokes. The yoke and exciting coil materials, and means for driving these are the same as those described in Embodiments 1 through 3.

Next, the operation of the actuator portion 5 of Embodiment 4 will be explained. FIG. 18(a) is a circuit development schematic showing a first self-hold state in a first rotational position, FIG. 18(b) is a schematic view of circuit development in the vicinity of the rotor magnet when a repulsing action is generated relative to this rotor magnet in the first rotational position, for illustrating the rotational operation of the rotor magnet from the first rotational position to the second rotational position, and FIG. 18(c) is a schematic view of circuit development in the vicinity of the rotor magnet when the second self-hold state is achieved in the second rotational position in the above-mentioned constitution. Furthermore, it is supposed that rotor magnet 17 is polarized at two poles in the direction shown in the figure.

As shown in FIG. 18(a), yoke tip 43 is located in the vicinity of the diagonal face 17A1 of the N pole of rotor magnet 17, and yoke tip 45 is located in the vicinity of the diagonal face 17B2 of the S pole of rotor magnet 17. Then, magnetic flux generated from the N pole of rotor magnet 17 flows from yoke tip 43 through yoke 47 to yoke tip 45, and a magnetic flux is also generated in the inside of rotor magnet 17 for the S pole in the direction of the N pole. Accordingly, a closed magnetic circuit is formed by magnetic flux flowing in the direction of the arrows in the yoke of the figure in the first rotational position, and a first self-hold state is realized.

Next, the reciprocating movement of actuator portion 5 of Embodiment 4 from a first rotational position to a second rotational position will be explained.

Figure 18:
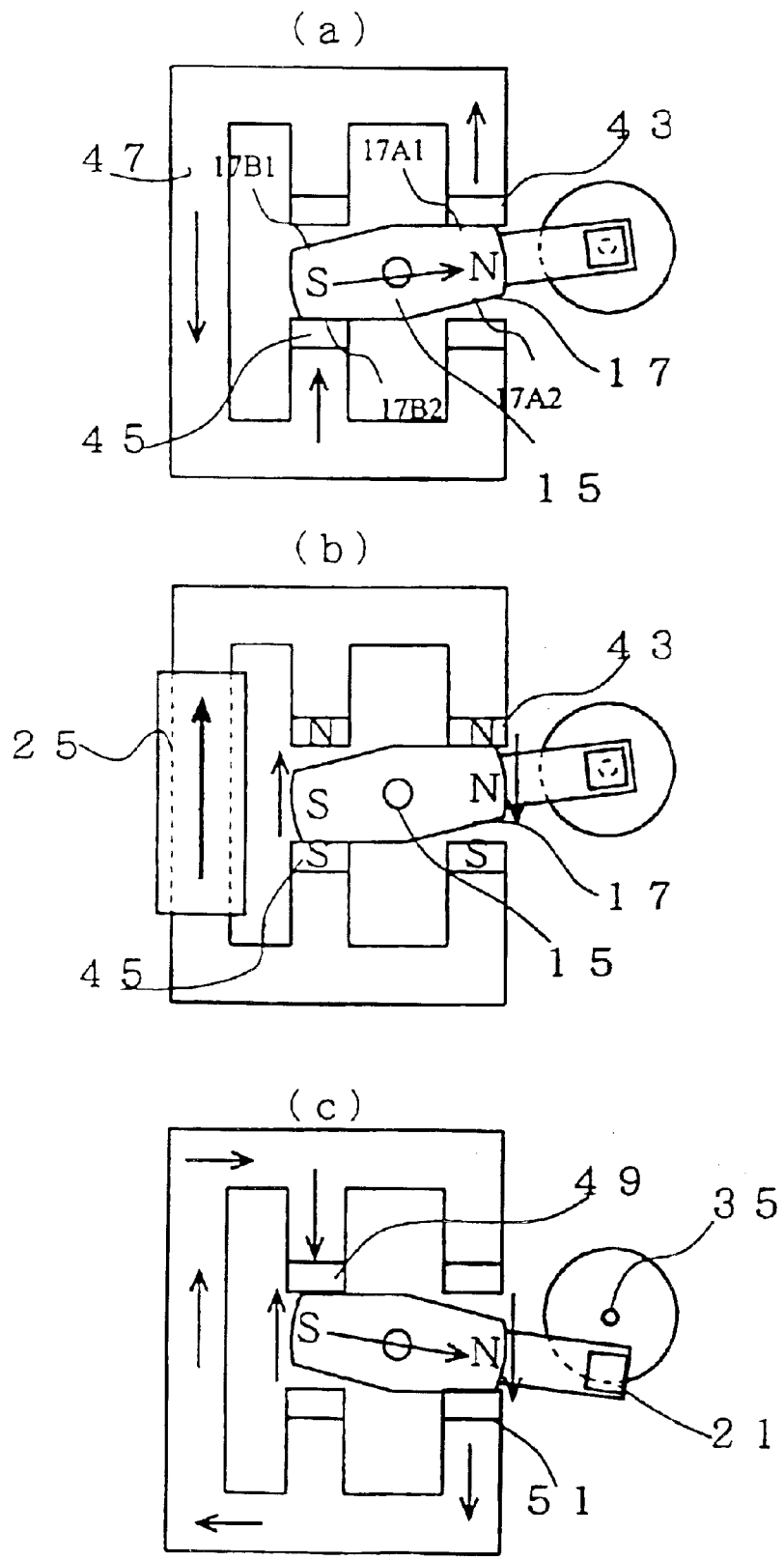
FIGS. 18(a), 18(b) and 18(c) are circuit development schematics for illustrating rotational operation from a first rotational position to a second rotational position in embodiment 4 of an actuator apparatus of the present invention.

First, as shown in FIG. 18(b), in the first rotational position, power is supplied to first exciting coil 25 such that yoke tip 43 constitutes an N pole, and yoke tip 45 constitutes an S pole. By so doing, a magnetic flux is generated in the direction of the arrows by first exciting coil 25, and a repulsing force is generated between the N pole of yoke 43 and the N pole of rotor magnet 17, and, at the same time, a repulsing force is also generated between the S pole of yoke tip 45 and the S pole of rotor magnet 17. Therefore, rotor magnet 17 generates a clockwise turning force having rotating shaft 15 as the center of rotation, and, as shown in FIG. 18(*c*), rotor magnet 17 rotates until it comes in contact with yoke tip 49 and yoke tip 51 (until the second rotational position), and stops.

Further, as described in Embodiment 1, if the power to first exciting coil 25 is shut off after a fixed period of time after rotor magnet 17 starts rotating, since the N pole of rotor magnet 17 exerts an attracting force on yoke tip 51, and a magnetic attracting force is exerted between the S pole and yoke tip 49, it is possible to move to the second rotational position. Here, a magnetic flux flows in the direction of the arrows inside the yoke, and a closed magnetic circuit is constituted the same as in either Embodiment 1 or Embodiment 2, enabling the realization of the second self-hold state.

(Embodiment 5)

Figure 19:
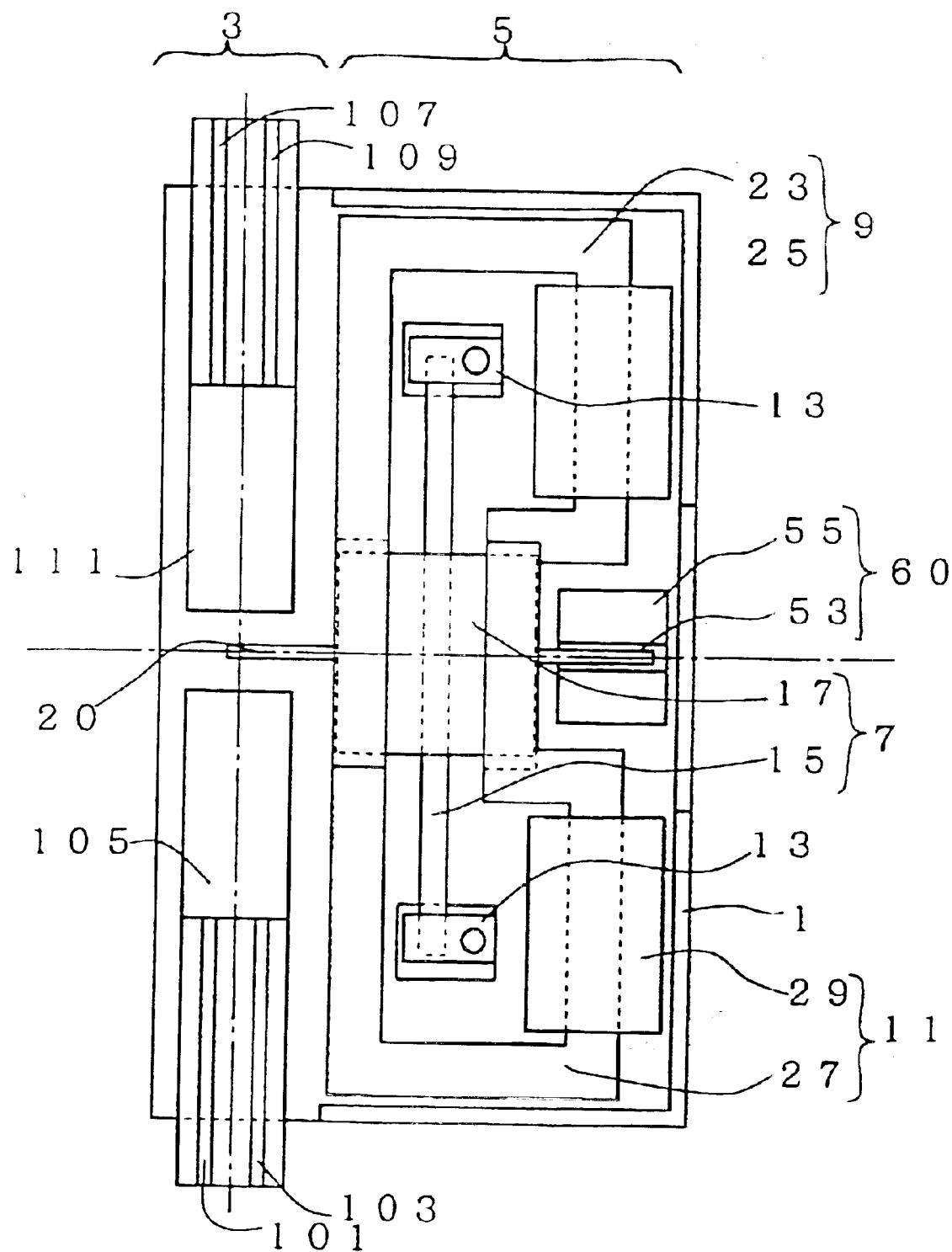
FIG. 19 is an apparatus plan view for illustrating the structure of embodiment 5 of an actuator apparatus of the present invention.

A fifth aspect of the embodiment will be explained using FIG. 19. The differences with Embodiment 1 are that a position detector (photo-interrupter, photo-reflector) for detecting the rotational position of the rotating body is mounted to the main body 1, making it possible to detect whether a mirror is reflecting or transmitting the light of the optical fibers, and that control of the power supply to the exciting coil can be performed by providing the output of the position detector as feedback.

The actuator portion 5 of Embodiment 5 has a position detector 60 for detecting the position of whether a reflecting mirror 20 is reflecting or is not reflecting the light of optical fibers either 101, 103 or 107, 109 arranged in an optical fiber portion 3, that is, whether the rotating body is in the first rotational position or the second rotational position, and is an example in which, for example, a photo-interrupter 55 is used in this position detector 60. Then, to block the light of the light source of the photo-interrupter 55, a shielding plate 53, which is integrally constituted to rotating body 7, is arranged in a practically symmetrical location with reflecting mirror 20 so as to be in balance with reflecting mirror 20, enabling the location of the reflecting mirror surface to be accurately determined. This shielding plate 53 can be one end of the same glass or other such flat plate as the reflecting mirror 20, or it can also be integrally formed from a resin material.

In this case, although not shown in the figure, the terminal of the position detector can be extended to the outside surface of the main body 1, and electrically connected to an external portion, and the position detector can detect the above-mentioned first and second rotational positions, and control the supplying of power to the exciting coils. For example, the application of voltages to the exciting coils shown in FIG. 14 can be controlled on the basis of rotational position information detected by position detector 60.

Making the center of gravity of rotating body 7 and the center of gravity of rotating shaft 15 approximately correspondent, as explained in Embodiment 1, is important from the standpoint of enhancing durability. Further, even if a photo-reflector is used instead of the above-mentioned photo-interrupter 55, this photo-reflector can be applied in the same way.

In Embodiment 1 through Embodiment 5 explained hereinabove, the cross-sectional shape of the rotor magnet as seen from the direction of the rotating shaft is either a rectangular shape, or a combination of trapezoidal shapes, but the shape of the rotor magnet is not limited to these, and can also be constituted with a cross-sectionally circular shape. Hereinbelow, examples of cross-sectionally circular-shaped rotor magnets will be explained using Embodiment 6 through Embodiment 10 shown in FIG. 20 through FIG. 24.

Further, in Embodiment 1 through Embodiment 5 explained hereinabove, the direction of polarization of the rotor magnet was a direction perpendicular to the direction of the rotating shaft, but the direction of polarization of the rotor magnet is not limited to this, and the direction of polarization can also be constituted in the same direction as the rotating shaft. Hereinbelow, examples of rotor magnets polarized in the direction of the rotating shaft will be explained using Embodiment 9 and Embodiment 10 shown in FIG. 23 and FIG. 24.

(Embodiment 6)

Figure 20:
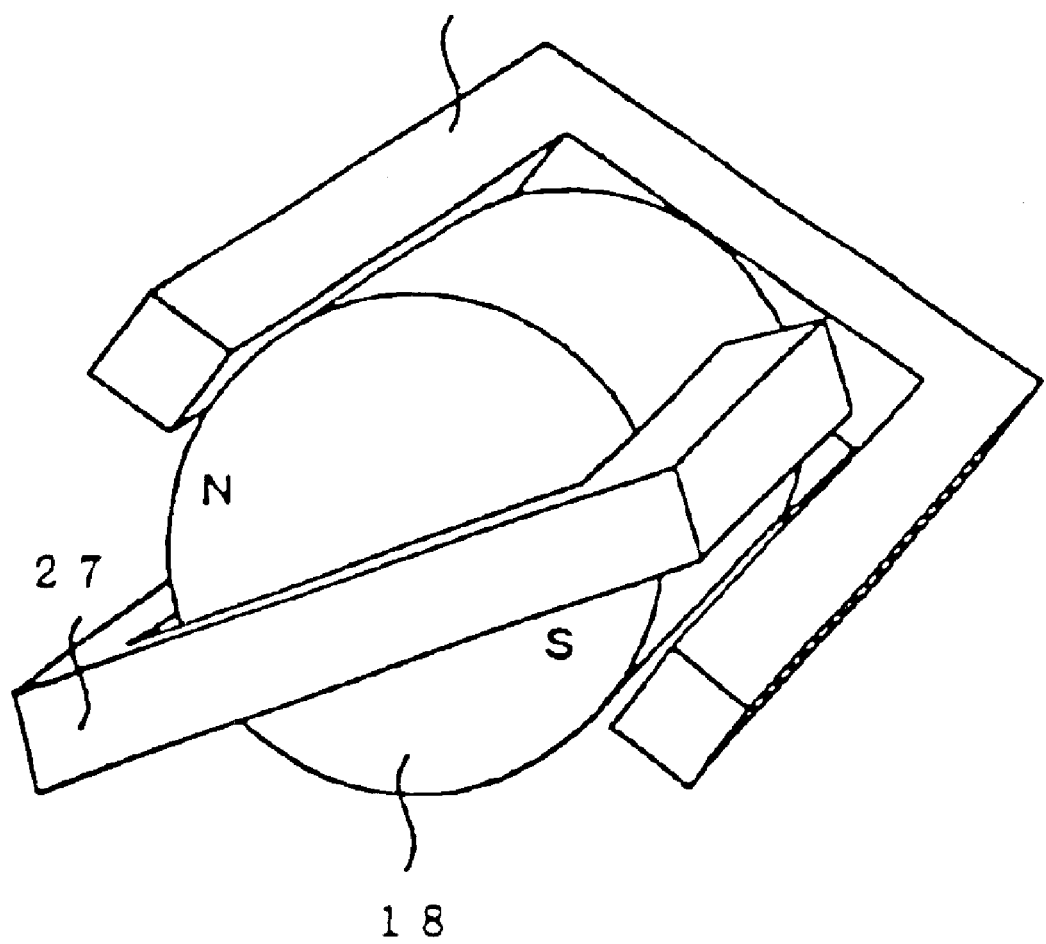
FIG. 20 is a diagram for illustrating embodiment 6 of an actuator apparatus of the present invention.

A sixth embodiment will be explained using FIG. 20. The sixth embodiment is an example of a cross-sectionally circular-shaped rotor magnet. Furthermore, since the constitution of other than the rotor magnet can be the same as Embodiment 1 through Embodiment 5, the rotor magnet and yokes will be explained here, but the other constitutions will be omitted.

Rotor magnet 18 is a cross-sectionally circular-shaped cylindrical body as seen from the direction of the rotating shaft, and is radially polarized. A first yoke 23 and a second yoke 27 are constituted so as to sandwich the outside of both ends of rotor magnet 18 in the radial direction, and to form a magnetic path in the end portion sides of rotor magnet 18 in the axial direction, and are arranged such that their circumferential positions differ. The two poles of rotor magnet 18 form a closed magnetic circuit between the respective two ends of either the first yoke 23 or the second yoke 27 by rotating around the rotating shaft, and self-holding is achieved at the rotational position thereof. Further, the rotational position of rotor magnet 18 can be switched by supplying power to an exciting coil (not shown in the figure) disposed on first yoke 23 and/or second yoke 27, and forming poles on each yoke.

(Embodiment 7)

Figure 21:
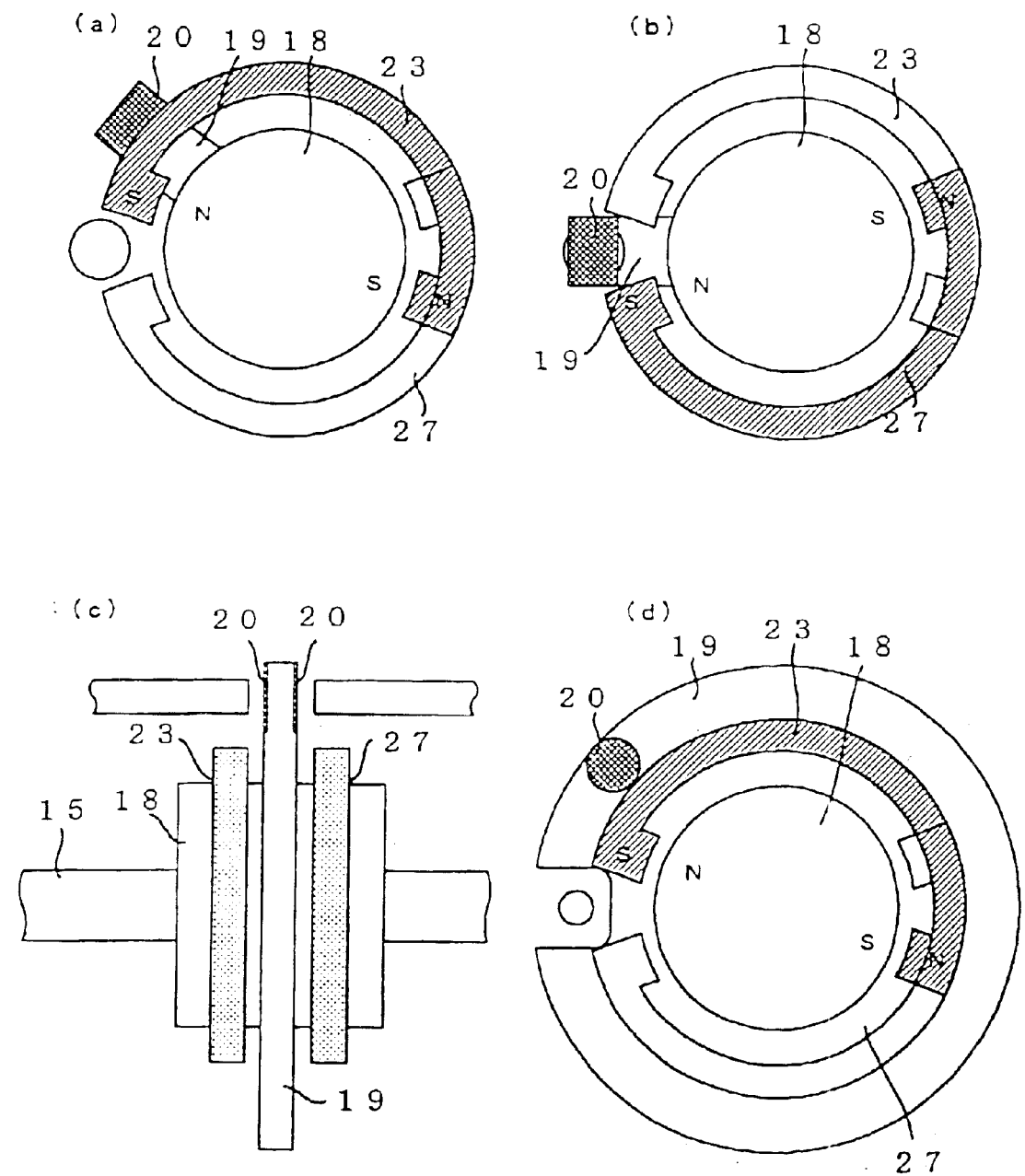
FIGS. 21(a) through 21(d) are diagrams for illustrating embodiment 7 of an actuator apparatus of the present invention.

A seventh embodiment will be explained using FIG. 21. The seventh embodiment is an example of a cross-sectionally circular-shaped rotor magnet, and is also an example of a constitution, which arranges a first yoke and a second yoke around the periphery of the rotor magnet. Furthermore, since the other constitutions can be made the same as Embodiment 1 through Embodiment 5, the rotor magnet and yokes will be explained here, but the other constitutions will be omitted.

Rotor magnet 18 is a cross-sectionally circular-shaped cylindrical body as seen from the direction of the rotating shaft, and is radially polarized, the same as the above-mentioned Embodiment 6. First yoke 23 and second yoke 27 are constituted in arc shapes so as to sandwich the outside of the periphery of rotor magnet 18 at both ends in the radial direction, and are arranged such that their circumferential positions differ.

The two poles of rotor magnet 18 form a closed magnetic circuit between the respective two ends of either the first yoke 23 or the second yoke 27 by rotating around the rotating shaft, and self-holding is achieved at the rotational position thereof. Further, the rotational position of rotor magnet 18 can be switched by supplying power to an exciting coil (not shown in the figure) disposed on first yoke 23 and/or second yoke 27, and forming poles on each yoke. FIG. 21(*a*) and FIG. 21(*b*) show the first rotational position and the second rotational position. Here, a shielding body 19 rotates in synchronization with rotor magnet 18. A reflecting mirror 20 is disposed on the shield body 19, and optical signal switching can be performed by moving this reflecting mirror 20 into and out of the gap between the opposing optical fibers.

Further, shielding body 19, as shown in FIG. 21(c) and FIG. 21(d), can be made into a disc shape. This disc-shaped shielding body 19 can be constituted so as to be mounted to a peripheral part of the rotor magnet 18 cylinder, or can be constituted so as to be aligned with the rotating shaft and interposed between two rotor magnets 18. By making the shielding body 19 disc shaped, it is possible to reduce the displacement of the location of the center of gravity of shielding body 19 from the location of the center of gravity of the rotating shaft.

(Embodiment 8)

Figure 22:
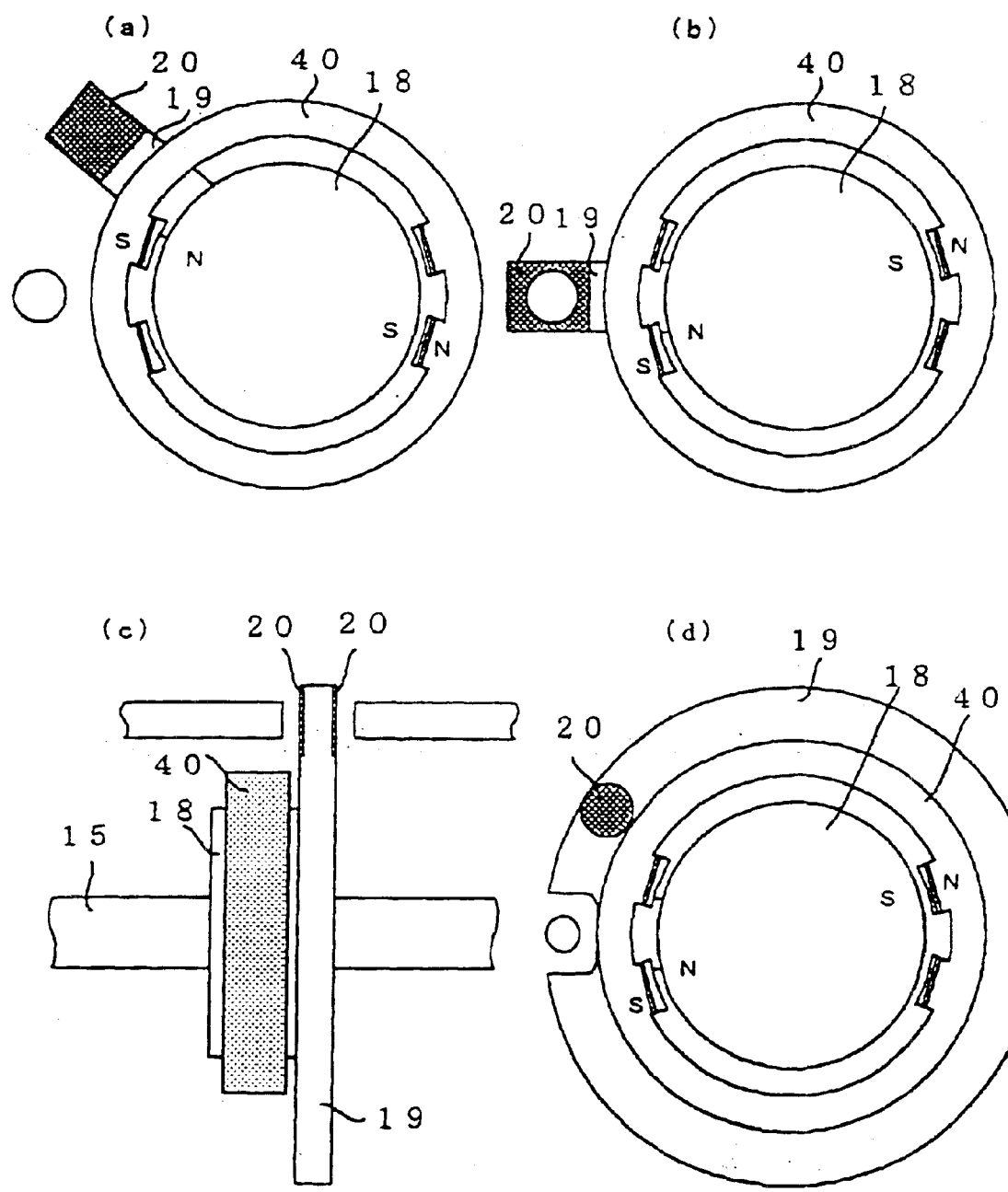
FIGS. 22(a) through 22(d) are diagrams for illustrating embodiment 8 of an actuator apparatus of the present invention.

An eighth embodiment will be explained using FIG. 22. The eighth embodiment is an example of a cross-sectionally circular-shaped rotor magnet, and is also an example in which the first yoke and second yoke are constituted as a single yoke, which is circumferentially arranged around the periphery of the rotor magnet. Furthermore, since the other constitutions can be made the same as Embodiment 1 through Embodiment 5, the rotor magnet and yoke will be explained here, but the other constitutions will be omitted.

Rotor magnet 18 is a cross-sectionally circular-shaped cylindrical body as seen from the direction of the rotating shaft, and is radially polarized, the same as the above-mentioned Embodiments 6 and 7. Yoke 40 is constituted in a ring shape so as to be arranged around the outer circumference of rotor magnet 18, and two pairs of convex portions are arranged in circumferentially different locations so as to face each of the two poles of rotor magnet 18.

The two poles of rotor magnet 18 form a closed magnetic circuit between any one pair of convex portions of the two pairs of convex portions comprising yoke 40, and self-holding is achieved at the rotational positions thereof. Further, the rotational position of rotor magnet 18 can be switched by supplying power to an exciting coil disposed on yoke 40, and forming a pole at any one of the convex portions of the two pairs of convex portions. FIG. 22(a) and FIG. 22(b) show the first rotational position and the second rotational position. Here, a shielding body 19 rotates in synchronization with rotor magnet 18. A reflecting mirror 20 is disposed on the shield body 19, and optical signal switching can be performed by moving this reflecting mirror 20 into and out of the gap between the opposing optical fibers.

Further, in FIG. 22(c) and FIG. 22(d), shielding body 19 can be made into a disc shape the same as in the above-mentioned FIG. 21(c) and FIG. 21(d). This disc-shaped shielding body 19 can be constituted so as to be mounted to a peripheral part of the rotor magnet 18 cylinder, or can be constituted so as to be aligned with the rotating shaft and interposed between two rotor magnets 18. By making the shielding body 19 disc shaped, it is possible to reduce the displacement of the location of the center of gravity of shielding body 19 from the location of the center of gravity of the rotating shaft.

(Embodiment 9)

Figure 23:
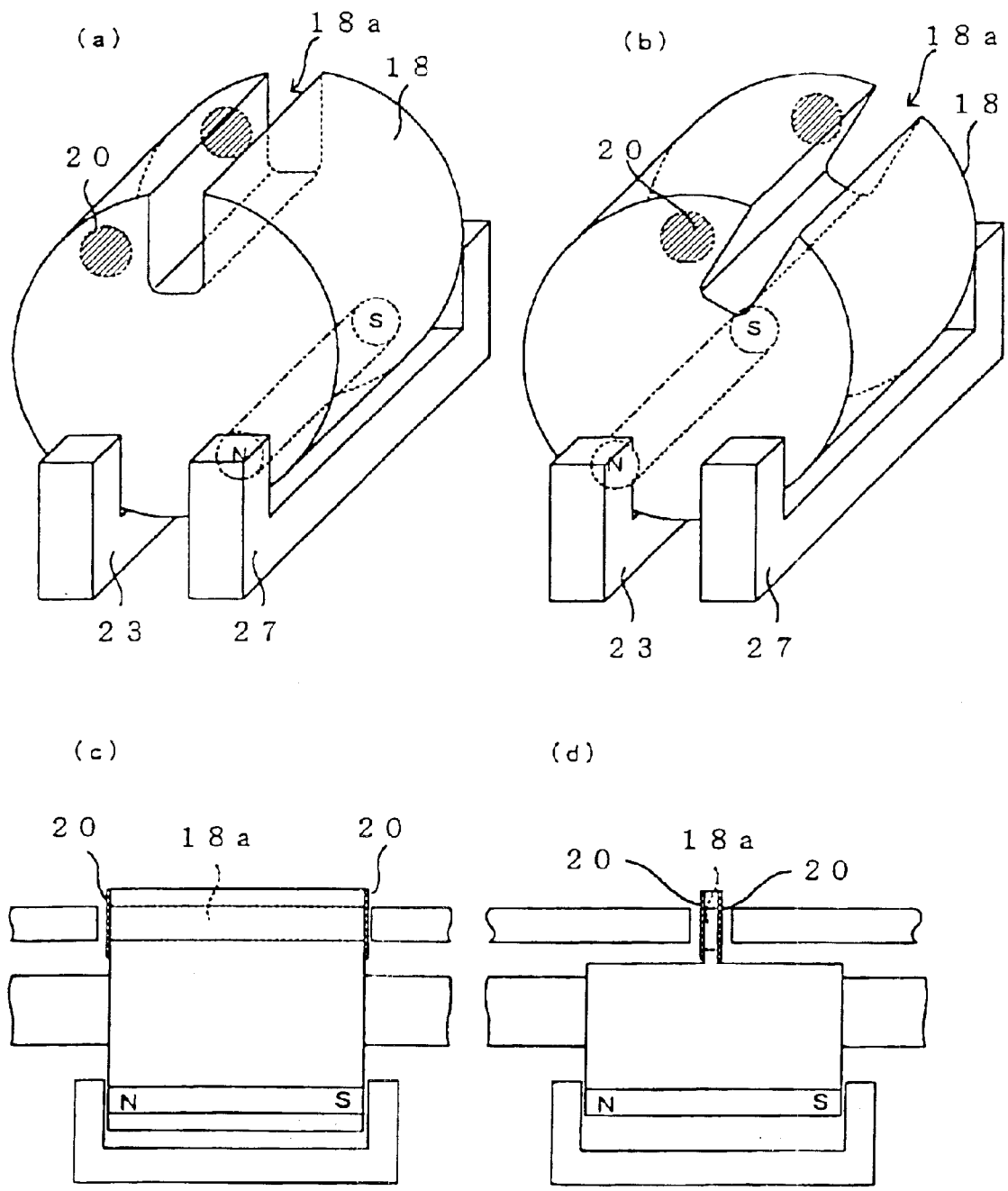
FIGS. 23(a) through 23(d) are diagrams for illustrating embodiment 9 of an actuator apparatus of the present invention.

A ninth embodiment will be explained using FIG. 23. The ninth embodiment is an example in which a rotor magnet is an axially polarized permanent magnet embedded in a cylindrical non-magnetic body, and further, a first yoke and a second yoke are arranged parallel to the rotor magnet in the axial direction. Furthermore, since the other constitutions can be made the same as the above-described Embodiment 1 through Embodiment 5, the rotor magnet and yokes will be explained here, but the other constitutions will be omitted.

Rotor magnet 18 is constituted by embedding an axially polarized permanent magnet inside a cylindrical body comprising a cross-sectionally circular-shaped non-magnetic body, as seen from the direction of the rotating shaft. Further, a groove 18a is provided parallel to the rotating shaft in the axial direction. This groove 18a is formed for optical signals to pass between opposing optical fibers not shown in the figure. Furthermore, in the example shown in the figure, the groove 18a is as long as the axial length of the rotor magnet 18, but the length of the groove 18a can be shortened by making the rotor magnet thickness of the part, where the optical fibers are arranged, thinner, making it possible to shorten the length of the optical path of light passing through the air.

A first yoke 23 and a second yoke 27 are arranged parallel to rotor magnet 18 in the axial direction, forming a closed magnetic circuit between the axially polarized poles of rotor magnet 18. Furthermore, the shape of the rotor magnet does not necessarily have to be a cross-sectionally circular-shaped cylinder shape, but to arrange the center of gravity on the rotating shaft, a cylindrical shape is suitable.

The two poles of rotor magnet 18 form a closed magnetic circuit between the respective two end portions of either first yoke 23 or second yoke 27 by rotating around the rotating shaft, and self-holding is achieved in the rotational position thereof. Further, the rotational position of rotor magnet 18 can be switched by supplying power to an exciting coil (not shown in the figure) disposed on first yoke 23 and/or second yoke 27, and forming poles on each yoke. FIG. 23(a) and FIG. 23(b) show the first rotational position and the second rotational position. Here, a groove 18a and a reflecting mirror 20 are disposed on rotor magnet 18, and optical signal switching can be performed by moving this groove 18a and reflecting mirror 20 into and out of the gap between the opposing optical fibers.

FIG. 23(c) and FIG. 23(d) are diagrams of the ninth embodiment viewed parallel to the axial direction, and FIG. 23(d) shows an example in which the thickness of rotor magnet 18, in which groove 18a is disposed, is constituted thinner.

(Embodiment 10)

Figure 24:
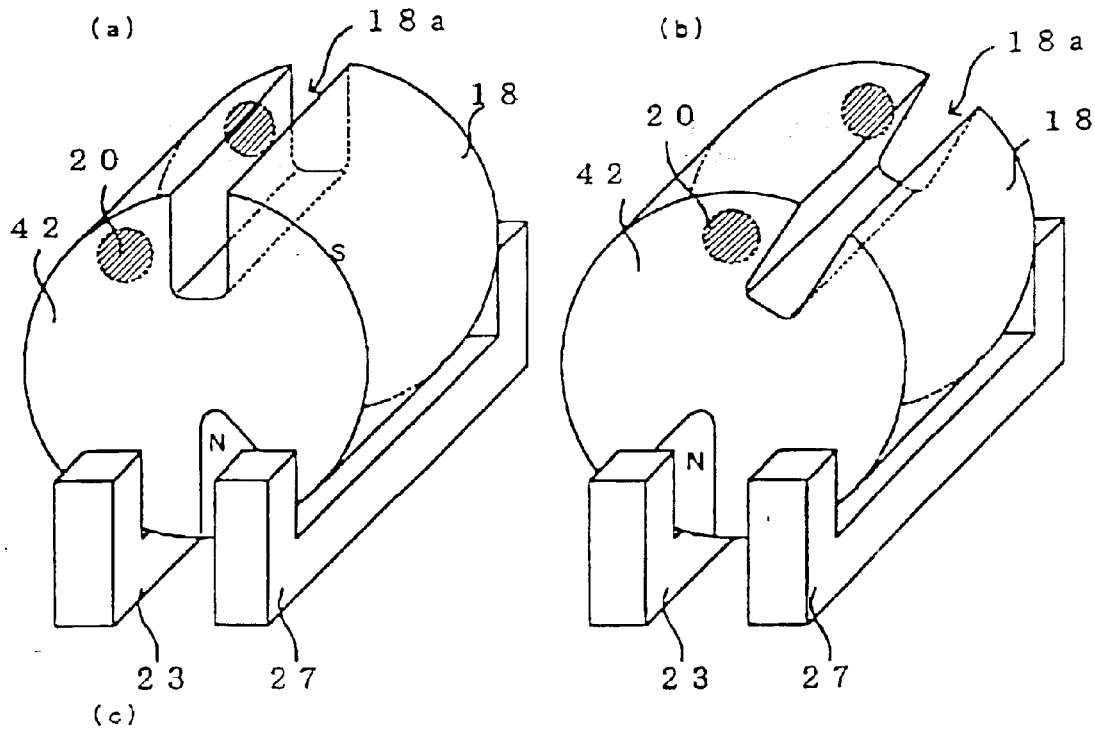
FIGS. 24(a), 24(b) and 24(c) are diagrams for illustrating embodiment 10 of an actuator apparatus of the present invention.
Figure 24:
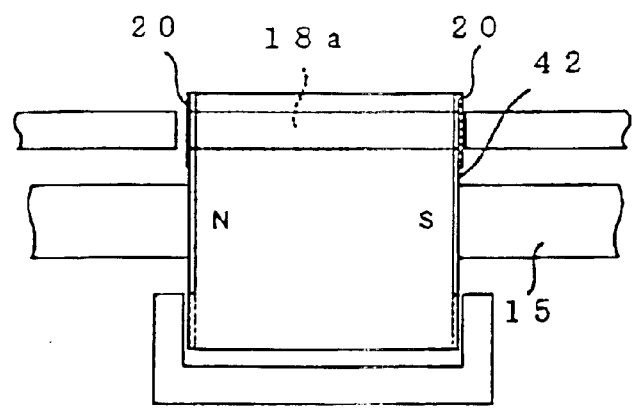
Figure 25:
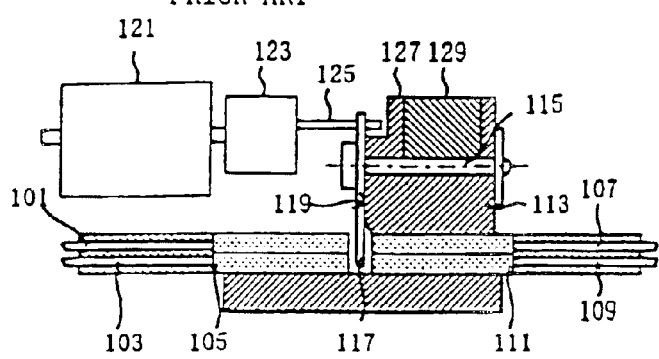
FIG. 25 an apparatus simplified cross-sectional view for illustrating the constitution of conventional reflecting mirror-type 2×2 fiber optical switch.

A tenth embodiment will be explained using FIG. 24. The tenth embodiment is an example in which the constitution is such that a rotor magnet constitutes an axially polarized cylindrical shape, and, in addition, high magnetic resistance material is partially disposed in the axial end portions, and further, a first yoke and a second yoke are arranged parallel to the rotor magnet in the axial direction. Furthermore, since the other constitutions can be made the same as the above-described Embodiment 1 through Embodiment 5, the rotor magnet and yokes will be explained here, but the other constitutions will be omitted.

Rotor magnet 18 constitutes an axially polarized permanent magnet of a cross-sectionally circular-shaped cylindrical body as seen from the direction of the rotating shaft, and further, a high magnetic resistance material 42 is disposed at both axial end portions thereof, a portion of this high magnetic resistance material 42 is notched, the surfaces of the poles of the permanent magnet are exposed, and the exposed surfaces of these two end portions are made to oppose one another axially.

Further, a groove 18a is provided parallel to the rotating shaft in the axial direction. This groove 18a is formed for optical signals to pass between opposing optical fibers not shown in the figure. Furthermore, in the example shown in the figure, the groove 18a is the same length as the axial length of rotor magnet 18, but the length of the groove 18a can be shortened by making the rotor magnet thickness of the part, where the optical fibers are arranged, thinner, making it possible to shorten the length of the optical path of light passing through the air. A first yoke 23 and a second yoke 27 are arranged parallel to rotor magnet 18 in the axial direction, forming a closed magnetic circuit between the exposed axial poles of rotor magnet 18. Furthermore, the shape of the rotor magnet does not necessarily have to be a cross-sectionally circular-shaped cylinder shape, but to arrange the center of gravity on the rotating shaft, a cylindrical shape is suitable.

The two exposed poles of rotor magnet 18 form a closed magnetic circuit between the respective two end portions of either first yoke 23 or second yoke 27 by rotating around the rotating shaft, and self-holding is achieved in the rotational position thereof. Even if a closed magnetic circuit were to be formed by the high magnetic resistance material in a rotational position of other than the two exposed poles, sufficient magnetic force to achieve self-holding would not be formed.

Further, the rotational position of rotor magnet 18 can be switched by supplying power to an exciting coil (not shown in the figure) disposed on first yoke 23 and/or second yoke 27, and forming poles on each yoke. FIG. 24(*a*) and FIG. 24(*b*) show the first rotational position and the second rotational position. Here, a groove 18*a* and a reflecting mirror 20 are disposed on rotor magnet 18, and optical signal switching can be performed by moving this groove 18*a* and reflecting mirror 20 into and out of the gap between the opposing optical fibers. Furthermore, FIG. 24(*c*) is a diagram of the tenth embodiment viewed parallel to the axial direction.

Furthermore, in the above explanations, in addition to a constitution in which striking members for determining a rotational position of a rotating body come in contact with the rotor magnet, the present invention can also be constituted using a stopper, which makes contact in a prescribed rotational position with either a convex portion or a concave portion disposed on the rotating shaft side.

Since an actuator apparatus of the above-mentioned constitutions performs the functions of a switch by operating a rotor magnet 17, which comprises a permanent magnet, and yokes, which are arranged on the periphery of this rotor magnet, and which comprise exciting coils, switching could be performed using less power than an actuator apparatus driven by a DC micromotor of the prior art. Further, since these constitutions are simple constitutions, which reduced the number of parts as much as possible, space saving in the apparatus itself could be achieved. In addition, since the constitutions minimize the angle of rotation pursuant to switching operations, and have few friction sliding portions, it was possible to enhance the durability of the moving portions. Accordingly, an actuator apparatus of the present invention is clearly technology particularly applicable to actuator apparatus in which compactness, long-term reliability, and resistance to outside shock are demanded.

Furthermore, an actuator apparatus of the present invention is not limited to the field of optical switches, but rather is a technology that can be applied to all switching mechanisms requiring repeatability of switching functions, apparatus durability, compactness and low power consumption. For example, for medical treatment purposes, it can also be applied as a microsurgery actuator for use in surgical operations, and for display purposes, it can be applied in a digital display device for arbitrarily switching displays by rotating a cylinder on which is arranged a mirror or display colors.

What is claimed is:

1. An actuator apparatus, comprising:
a rotating body, comprising a rotating shaft supported in a freely rotating condition, and a rotor magnet fastened to this rotating shaft;
driving means for rotationally driving said rotating body; and
at least one yoke for forming a closed magnetic circuit connecting the poles of said rotor magnet, and for self-holding the rotating body in a prescribed rotational position,
wherein said rotating body includes a driven body capable of moving in accordance with the rotation of this rotating body, and
wherein said driven body has a reflective surface.

2. An actuator apparatus, comprising:
a rotating body, comprising a rotating shaft supported in a freely rotating condition, and a rotor magnet fastened to this rotating shaft;
first defining means for defining said rotating body in a first rotational position;
second defining means for defining said rotating body in a second rotational position;
driving means for rotationally driving said rotating body between the first defining means and the second defining means; and
at least one yoke for forming a closed magnetic circuit connecting the poles of said rotor magnet in at least one of said first rotational position and said second rotational position, and for self-holding the rotating body in this rotational position,
wherein said rotating body includes a driven body capable of moving in accordance with the rotation of this rotating body, and
wherein said driven body has a reflective surface.

3. The actuator apparatus according to claim 1 or claim 2, wherein at least one of said rotor magnet and said yoke is a permanent magnet, and the other is an electromagnet.

4. The actuator apparatus according to claim 1 or claim 2, wherein said driving means comprises either at least one exciting coil disposed in at least one yoke, or an exciting coil disposed in the rotor magnet, and the rotating shaft is rotated by a magnetic attracting action, a magnetic repulsing action, or both exerted between the yoke and the rotor magnet by either one of said exciting coils.

5. The actuator apparatus according to claim 2, wherein said defining means comprises a rotational position determining member for determining a rotational position by either making contact with, or exerting a magnetic attraction on a portion of said rotating body, in a rotational position defined by this defining means.

6. The actuator apparatus according to claim 1 or claim 5, wherein said yoke is constituted by integrating a rotational position determining member, which is arranged so as to make contact with or to be magnetically attracted to one pole of the rotor magnet at a prescribed rotational position, and another rotational position determining member, which is arranged so as to make contact with or to be magnetically attracted to the other pole of the rotor magnet.

7. The actuator apparatus according to claim 1, claim 2 or claim 5, wherein said rotor magnet is polarized at two poles, either perpendicularly or parallel to the rotating shaft direction.

8. The actuator apparatus according to claim 5, wherein said rotating body and said rotational position determining member have shapes capable of making surface contact.

9. The actuator apparatus according to claim 1, claim 2 or claim 5, wherein the center of gravity of said rotor magnet and the center of gravity of said rotating shaft are approximately correspondent.

10. The actuator apparatus according to claim 1 or claim 2, wherein the centers of gravity of said rotor magnet and said driven body, and the center of gravity of said rotating shaft are approximately correspondent.

11. The actuator apparatus according to claim 1 or claim 2, wherein said reflective surface is perpendicular to the rotating shaft.

12. The actuator apparatus according to claim 1 or claim 2, further comprising:

a shielding plate in a location that is symmetrical with the reflective surface relative to the rotating shaft; and a position detector for detecting a rotational position of said rotating body in accordance with the operation of this shielding plate.

* * * * *